(12) United States Patent
Paris et al.

(10) Patent No.: US 12,703,795 B2
(45) Date of Patent: Aug. 11, 2026

(54) ORGANIC SLURRY AND METHOD FOR MANUFACTURE THEREOF

(71) Applicant: The Willamette Valley Company LLC, Eugene, OR (US)

(72) Inventors: Jesse L. Paris, Eugene, OR (US); Matthew G. Peterson, Eugene, OR (US); James A. Livings, Lithonia, GA (US); Sudip Chowdhury, Eugene, OR (US); Curtis G. Burton, Eugene, OR (US)

(73) Assignee: The Willamette Valley Company, LLC, Eugene, OR (US)

(*) Notice: Subject to any disclaimer, the term of this patent is extended or adjusted under 35 U.S.C. 154(b) by 201 days.

(21) Appl. No.: 18/792,936

(22) Filed: Aug. 2, 2024

(65) Prior Publication Data

US 2024/0392132 A1 Nov. 28, 2024

Related U.S. Application Data

(60) Division of application No. 18/458,745, filed on Aug. 30, 2023, now Pat. No. 12,054,615, which is a (Continued)

(51) Int. Cl.

| | |
|---|---|
| ***C08L 91/06*** | (2006.01) |
| ***B32B 21/08*** | (2006.01) |
| ***C08L 29/04*** | (2006.01) |

(52) U.S. Cl.

CPC .............. *C08L 91/06* (2013.01); *B32B 21/08* (2013.01); *C08L 29/04* (2013.01)

(58) Field of Classification Search

None

See application file for complete search history.

(56) References Cited

U.S. PATENT DOCUMENTS

| | | | |
|---|---|---|---|
| 2,660,567 | A | 11/1953 | Cunder et al. |
| 4,340,500 | A | 7/1982 | Boylan |

(Continued)

FOREIGN PATENT DOCUMENTS

| | | |
|---|---|---|
| CL | 200302347 | 1/2005 |
| CL | 201200451 | 4/2013 |

(Continued)

OTHER PUBLICATIONS

International Search Report mailed Feb. 15, 2018 in International Application No. PCT/US2017/63654 filed Nov. 29, 2017.

(Continued)

*Primary Examiner* — Stefanie J Cohen

(74) *Attorney, Agent, or Firm* — Ram W. Sabnis

(57) ABSTRACT

A wax-extender emulsion including a plurality of wax-extender complex particles suspended in water is described. A wax-extender complex includes a wax component, an organic extender component and a surfactant that stabilizes the wax component and the organic extender component collectively to form the wax-extender complex. The wax-extender emulsion comprises from 2 wt % to 30 wt % organic extender. During manufacturing, the organic extender and wax component are emulsified and homogenized together to produce the wax-extender emulsion. The wax-extender emulsion can be co-applied as a mixture with adhesive resin during wood-based composite manufacturing.

6 Claims, 13 Drawing Sheets

Related U.S. Application Data division of application No. 18/059,754, filed on Nov. 29, 2022, now Pat. No. 11,866,587, which is a continuation of application No. 17/694,169, filed on Mar. 14, 2022, now Pat. No. 11,566,134, which is a continuation of application No. 16/464,857, filed as application No. PCT/US2017/063654 on Nov. 29, 2017, now Pat. No. 11,591,472.

(60) Provisional application No. 62/429,096, filed on Dec. 2, 2016.

(56) References Cited

U.S. PATENT DOCUMENTS

| | | | | |
|---|---|---|---|---|
| 4,612,051 | A | 9/1986 | Miller, Jr. et al. | |
| 4,752,319 | A | 6/1988 | DelliColli | |
| 5,635,024 | A | 6/1997 | Shall | |
| 5,636,024 | A * | 6/1997 | Crookham | G01M 11/005 356/613 |
| 2005/0178291 | A1 | 8/2005 | Kalbitz et al. | |
| 2007/0181035 | A1 | 8/2007 | Wantling et al. | |
| 2011/0149390 | A1 | 6/2011 | Petersen et al. | |
| 2011/0251306 | A1 | 10/2011 | Theberge et al. | |
| 2012/0214012 | A1 | 8/2012 | Briner et al. | |
| 2013/0042792 | A1 | 2/2013 | Stuart et al. | |
| 2015/0159017 | A1 | 6/2015 | Ayambem et al. | |
| 2015/0284566 | A1 | 10/2015 | Sniady et al. | |
| 2016/0006036 | A1 | 1/2016 | Maruyama et al. | |
| 2016/0160016 | A1 | 6/2016 | Lundgard et al. | |

FOREIGN PATENT DOCUMENTS

| | | | |
|---|---|---|---|
| CN | 1090914 | A | 8/1994 |
| CN | 103305053 | A | 9/2013 |
| WO | WO 91/04990 | | 4/1991 |
| WO | WO 2004/044086 | A1 | 5/2004 |
| WO | WO 2010/054467 | A1 | 5/2010 |

OTHER PUBLICATIONS

Second Examination Report from the Chile Patent Office dated Feb. 22, 2021 (with English translation) (23 pages).

Extended European Search Report dated Jun. 29, 2020 in EP Application No. 17876482.5 (13 pages).

First Examination Report from the Chile Patent Office dated Aug. 26, 2020 (with English translation) (28 pages).

Kowalczyk et al., Physiocochemical and Antioxidant Properties of Biopolymer/Candelilla Wax Emulsion Films Containing Hop Extract—a Comparative Study, Food Hydrocolloids, Elsevier BV, Netherlands, vol. 69, Apr. 9, 2016, pp. 384-392, ISSN: 0268-005X, DOI: 10.1016/J. FOODHYD (9 pages).

Office Action for published U.S. Appl. No. 16/464,857 mailed Jul. 14, 2022 (21 pages).

Communication for European Application No. 17 876 482.5 dated Jun. 27, 2022 (4 pages).

* cited by examiner

Substrate After Adhesive and Wax Application

TRADITIONAL WAX EMULSION
Reduced adhesive efficacy at overlap locations

A

WAX-EXTENDER MICELLE EMULSION
Retained adhesive efficacy at overlap locations

SIMULTANEOUS CO-APPLICATION

- Wood Substrate (ex. OSB Strand)
- Co-applied (mixed) extended wax and resin droplets

ORGANIC SLURRY AND METHOD FOR MANUFACTURE THEREOF

CROSS-REFERENCE TO RELATED APPLICATIONS

This application is a divisional application of U.S. patent application Ser. No. 18/458,745 entitled “ORGANIC SLURRY AND METHOD FOR MANUFACTURE THEREOF,” filed Aug. 30, 2023, which is a divisional application of U.S. patent application Ser. No. 18/059,754, filed Nov. 29, 2022, now U.S. Pat. No. 11,866,587; which is a continuation application of U.S. patent application Ser. No. 17/694,169, filed Mar. 14, 2022, now U.S. Pat. No. 11,566,134; which is a continuation application of U.S. patent application Ser. No. 16/464,857, filed May 29, 2019, now U.S. Pat. No. 11,591,472; which was a National Stage Application of International Application No. PCT/US2017/063654, filed Nov. 29, 2017; which claims the benefit of U.S. Provisional Patent Application No. 62/429,096, filed Dec. 2, 2016, each of which are hereby incorporated herein by reference in their entirety.

BACKGROUND

1. Technical Field

This disclosure relates to wood-based composites, the components used to manufacture wood-based composites and the methods for manufacturing wood-based composites. This disclosure further relates to the use of an extended wax emulsion in manufacture of wood-based composites.

I. 2. Background Information

Wood-based composites are generally manufactured by binding strands, particles, fibers, or furnish of one or more types of wood together with adhesive. Wood-based composites may include, but are not limited to, oriented strand board (OSB), particle board, plywood, waferboard, chipboard, medium-density fiberboard, parallel strand lumber, oriented strand lumber (OSL), and laminated strand lumber.

Moisture durability is important for the performance of products made from wood-based composites. For example, moisture durability is very important in densified panel products, including particleboard, fiber board products, and oriented strand board, where product strength is highly dependent on panel density. As a hygroscopic material, wood absorbs moisture and swells. In densified wood-based composites, this swelling can result in decreased mechanical integrity. For products made from wood-based composites, moisture-induced cyclic swelling and shrinkage can cause internal stress and potentially failure of the bonds between the wood strands, particles, or fibers and the adhesive holding the composite together. Wax can be helpful in reducing the intrinsic hygroscopicity of the wood-based composite panel, thereby reducing the extent of water absorption and moisture-induced swelling. The wax component is often referred to as a sizing agent.

Slack waxes and water-based wax emulsions have conventionally been added to wood-based composite panels to improve moisture durability and to help lubricate wood fiber material for greater efficiency during manufacturing. However, adding too much wax can diminish mechanical properties, perhaps by causing barriers between wood and adhesive resins.

Conventionally, wax sizing agents are sprayed or atomized into particle blenders in a similar manner as liquid and powder adhesive resins to aid with moisture performance of the wood-based composite being manufactured.

However, it is inevitable that some overlap will occur between the adhesive and the wax components on some of the wood particle materials. Where this occurs, the efficacy of the adhesive resin is decreased because the wax layer interferes with the direct wood/adhesive/wood interface. To try to overcome the decrease in efficacy due to the wax, greater amounts of resin can be used in an attempt to achieve the same level of mechanical integrity (i.e., stiffness, bond strength, bending strength, etc.). To determine whether mechanical integrity has diminished, various methods can be used to measure performance characteristics of a wood-based composite. For example, moisture durability can be evaluated by measuring thickness swell, linear expansion, and water absorption for a wood-based composite. Additionally, mechanical strength of a wood-based composite can be measured parallel or perpendicular to the panel dimension, via shear testing, and with internal bond tests.

Much of the wax used for production of wood-based composites is a byproduct of oil refining and is thus a non-renewable resource. As such, it is desirable to reduce the amount of wax used in wood-based composites without sacrificing moisture durability, dimensional stability or mechanical performance. For example, comparable moisture performance can be achieved using wax emulsions that have a reduced amount of wax solids relative to slack wax systems, which are comprised completely of molten wax. Wax emulsions use water as a delivery vehicle thereby increasing the total volume of liquid dispensed into a blender relative to molten slack wax. Thus, it is possible to achieve a greater distribution of wax solids onto wood particles or fibers. It is also possible to offset a portion of the total wax solids that are used in emulsion waxes using an organic extender in place of a portion of the wax solids. Using an organic extender to offset a portion of the wax solids reduces the amount of wax used in the wood-based composite and can aid in distributing the wax component more broadly among the wood fibers than just a reduction in wax volume or mass. Further, using an organic extender to replace a portion of the total wax can aid in compatibilizing the dissimilar wax and resin materials, thus enabling greater adhesive efficacy for resin droplets that overlap wax droplets on wood particle materials during production of a wood-based composite. Increased compatibility may also allow for simultaneous, co-application of resin mixed with extended wax emulsions, further improving both wax and resin distribution on the wood furnish.

BRIEF SUMMARY

In a first aspect of the invention, a wax-extender emulsion comprises a wax-extender complex suspended in water, wherein the wax-extender complex comprises a wax component, an organic extender component and a surfactant. The surfactant associates with and stabilizes the wax component and the organic extender component, which are closely associated with one another, to form the complex, wherein the wax-extender emulsion comprises from 2 wt % to 30 wt % organic extender.

In a feature of the first aspect, the wax component comprises a petroleum-based wax, a bio-based wax, a synthetic wax or mixtures thereof. With regard to this feature, the petroleum-based wax comprises slack wax. With further regard to this feature, the slack wax comprises between 5 wt % to 30 wt % oil, having a melting point below 170° F. and a flash point below 600° F. In accordance with this feature, the petroleum-based wax further comprises oil, petrolatum, pure paraffinic, microcrystalline, scale waxes, or combinations thereof.

In an additional feature of the first aspect, the organic extender comprises lignocelluloses, lignocellulosic agricultural residue, lignin materials, non-lignocellulosic agricultural materials, lignin derivatives or mixtures thereof. With regard to this feature, the lignin material comprises one or more byproducts of a pulping process, wherein the pulping process is selected from the group consisting of kraft pulping, sulfite pulping, ASAM organosolv pulping, acid hydrolysis, soda pulping, Alcell® pulping, Organocell pulping, Acetosolv pulping, and combinations thereof. Further, regarding this feature, the lignin material comprises one or more byproducts of kraft pulping. Additionally, the lignocellulosic and non-lignocellulosic agricultural residue comprises tree bark, wood flour, nut shells, seed hulls, corn cobbs, sugar beet residuals, sugar cane residuals, wheat flour, wheat bran, corn flour, corn starch, rice flour, soy flour, or mixtures thereof.

With further regard to the first aspect, the emulsion comprises 20 wt % to 60 wt % wax component. In another feature of the first aspect, the emulsion comprises 30 wt % to 70 wt % combined wax component and organic extender.

In a further feature of the first aspect, the emulsion surfactant comprises the reaction product of a fatty acid and a base. With regard to this feature, the fatty acid comprises a $C_{12}$ to $C_{22}$ fatty acid. With further regard to this feature, the fatty acid comprises lauric acid, palmitic acid, stearic acid, behenic acid, oleic acid, linoleic acid, linolenic acid, isomers thereof or mixtures thereof. Additionally, the fatty acid may account for up to 5 wt % of the wax emulsion. Further, the base may comprise a mono-functional amine, a multi-functional amine, cyclic amine, an alkali metal salt, an alkaline earth metal salt, ammonia or combinations thereof. With further regard to this feature, the base accounts for up to 5 wt % of the wax emulsion.

In another feature of the first aspect, the wax-extender emulsion further comprises a defoamer and a pH modifier. With regard to this feature, the defoamer comprises a water-based defoamer, a silicone-based defoamer, a silicone-free defoamer, an oil-based defoamer, a polymer-based defoamer, or mixtures thereof. With further regard to this feature, the pH modifier comprises a mono-functional amine, a multi-functional amine, an alkali metal salt, an alkaline earth metal salt or combinations thereof. In accordance with this feature, the wax-extender emulsion comprises 30 wt % to 60 wt % petroleum-based wax as the wax component and 5 wt % to 20 wt % lignin material as the organic extender, wherein the emulsion surfactant comprises the reaction product of a $C_{12}$-$C_{20}$ fatty acid and a complimentary tri-functional amine, the defoamer comprises a nonionic blend of mineral oil and silica derivatives, and the pH modifier comprises sodium carbonate and sodium hydroxide.

In yet another feature of the first aspect, a particle size distribution curve for the wax-extender emulsion has a single, uniform peak. In an additional feature of this aspect, a peak wax volatility temperature of the wax component in the wax-extender emulsion is higher than a peak wax volatility temperature of a control wax emulsion utilizing the same base slack wax material. With regard to this feature, the peak wax volatility temperature of the wax component in the wax-extender emulsion is between about 1° C. and 40° C. higher than the peak wax volatility temperature of a control wax emulsion utilizing the same base slack wax material. With further regard to this feature, the peak wax volatility temperature of the wax component in the wax-extender emulsion is between about 20° C. and 40° C. higher than the peak wax volatility temperature a control wax emulsion utilizing the same base slack wax material.

In a second aspect of the invention, a process for producing a wax-extender emulsion, comprises introducing water at a temperature of 35° C. to 95° C. to a vessel; introducing organic extender to the vessel; introducing components that form an emulsion surfactant to the vessel; introducing a molten wax component to the vessel; forming a wax-extender emulsion by mixing the water, organic extender, surfactant-forming components, and molten wax in the vessel; and imparting a high degree of shear and mixing to the formed emulsion such that the molten wax and the organic extender are co-homogenized.

In a feature of this aspect, a homogenizer is used to impart a high degree of shear and mixing on the wax-extender emulsion. In another feature, the process further comprises introducing defoamer to the container prior to emulsification. In yet another feature, the process further comprises introducing a pH modifier to the container prior to emulsification. In an additional feature, agitation is taking place during introduction of the water, the organic extender, the pH modifier, and the wax component. In a further feature, the organic extender is introduced in the form of an organic extender slurry. With further regard to this feature, the process further comprises preparing the organic extender slurry by combining and mixing water, defoamer, pH modifier and organic extender thereby producing the organic extender slurry. In addition, combining and mixing may comprise imparting high shear and mixing on the water, defoamer, pH modifier and organic extender. In an additional feature, the process further comprises cooling the wax-extender emulsion after imparting high shear and mixing.

In a third aspect of the invention, a method of simultaneously co-applying a mixture of a wax-extender emulsion and an adhesive resin for use in manufacturing a wood-based composite comprises introducing a wax-extender emulsion to a mixing device; introducing an adhesive resin to a mixing device; mixing the wax-extender emulsion and the adhesive resin in the mixing device, and simultaneously co-applying the mixed wax-extender emulsion and adhesive resin to wood material for use in manufacturing a wood-based composite.

In a feature of this aspect, the wax-extender emulsion is produced by co-emulsifying and co-homogenizing an organic extender and a wax component in water. In another feature of this aspect, the adhesive resin comprises pMDI. In yet another feature of this aspect, the mixing device is an in-line static mix tube.

In an additional feature of this aspect, the mixture of wax-extender emulsion and adhesive resin is applied in the form of droplets, and wherein each droplet comprises both wax-extender emulsion and adhesive resin. With regard to this feature, when the mixed wax-extender emulsion and adhesive resin is applied, a mixture having a 5 wt % reduction in the amount of adhesive resin introduced to the mixing device relative to the amount of resin introduced to the mixing device when a conventional wax emulsion is used exhibits a comparable level of performance to separately applied conventional wax emulsion and adhesive resin. With further regard to this feature, the mixture has a 10 wt % reduction in the amount of adhesive resin relative to that when a conventional wax emulsion is used. In addition, performance may be evaluated using factors selected from the group consisting of thickness swell, water absorption, and internal bond strength. Further, the droplets may be formed via spray or atomization.

DETAILED DESCRIPTION

Figure 1:
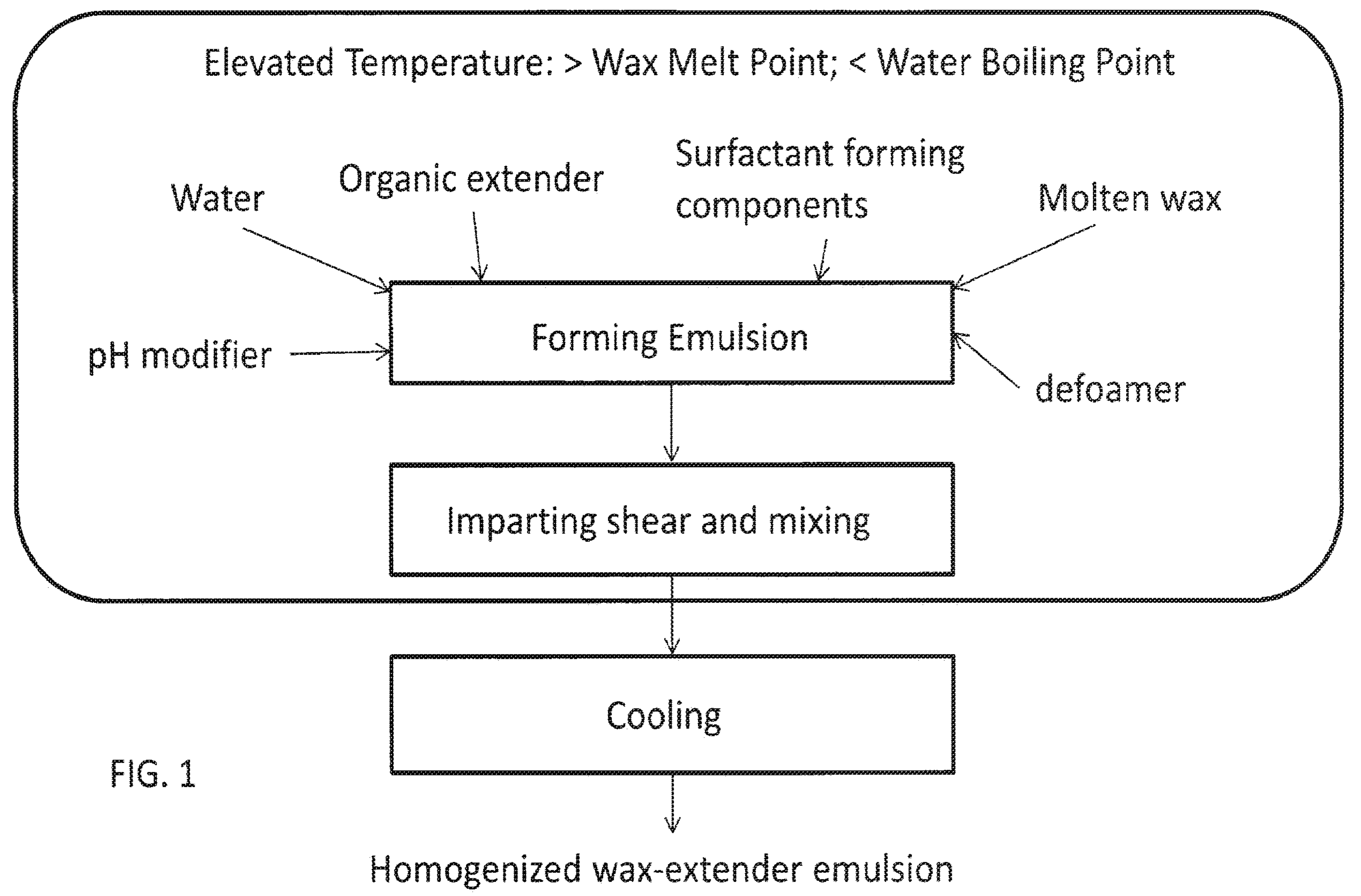
FIG. 1 is a schematic representation of a process for manufacturing an exemplary embodiment of a wax-extender emulsion in accordance with an aspect of the present invention.

A wax-extender emulsion for use in the manufacture of wood-based composites is described herein. The wax-extender emulsion comprises a wax-extender complex suspended in water. A wax-extender complex comprises a wax component, an organic extender component and a surfactant that surrounds and stabilizes the wax component and the organic extender component collectively to form the wax-extender complex. The wax component and the organic extender component are closely associated with one another and are stabilized by the surfactant to form the wax-extender complex.

Having the organic extender component closely associated with the wax component in the wax-extender complex can provide performance advantages for wood-based composite products manufactured using the wax-extender emulsion comprising the wax-extender complex. For example, the wax-extender emulsion may provide reduced wax volatility during panel production, may provide better distribution on wood furnish, may provide improved compatibility with adhesive resins, may allow for the simultaneous co-application of adhesive resins, may extend the performance of adhesive resins, and may provide improved resistance to static and dynamic shear forces on the liquid emulsion during various handling conditions encountered during production, distribution and use. Additionally, the organic extender component offsets a portion of the wax component without diminishing moisture performance of the wax-extender emulsion. Thus, the organic extender can improve aspects of performance while matching or improving dimensional stability and water absorption performance of wood-based composites manufactured using the wax-extender emulsion.

In the wax-extender emulsion, the wax component may comprise a variety of different wax materials. Any wax material suitable for creating a water-based emulsion can be used. The amount of wax component used in the wax-extender emulsion varies depending on the final product use. The way in which the final product will be used (including application and location) can affect viscosity and shear stability requirements for the wax-extender emulsion. Accordingly, the amount of total solids and the amount of wax component and extender component relative to one another can also be affected. The wax-extender emulsion may comprise 20 wt % to 60 wt % wax component. Thus, the wax-extender emulsion may comprise 20 wt %-55 wt %, 20 wt %-45 wt %, 22 wt %-43 wt %, 24 wt %-41 wt %, 26 wt %-40 wt %, 28 wt %-39 wt %, 29 wt %-38 wt %, and 30 wt %-37 wt % wax component. For example, the wax-extender emulsion may comprise 20 wt %, 22 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 45 wt %, 50 wt %, 55 wt %, or 60 wt % wax component.

The wax component can comprise a broad range of petroleum-based wax, bio-based wax, synthetic wax, additional waxes known to the relevant art or mixtures thereof. For example, the wax component may comprise a blend of two or more petroleum-based waxes, a blend of petroleum-based wax and bio-based wax, or a blend of petroleum-based wax and synthetic wax. One of ordinary skill in the art would be able to identify and produce blends of waxes having the desired physical properties using any of petroleum-based waxes, bio-based waxes, synthetic waxes, other suitable waxes or mixtures thereof.

The term "petroleum-based wax" refers to any wax derived from oil refining that is suitable for use as a sizing agent for wood-based composites. Petroleum-based waxes can be defined by the amount of oil, microcrystalline wax and paraffinic wax that they contain. In an embodiment, the petroleum wax may be a petroleum slack wax. Slack wax is the crude wax produced by chilling and solvent filter-pressing wax distillate. An exemplary slack wax may comprise between 5 wt %-30 wt % oil, have a melt point below 170° F., and a flash point below 600° F. Blends of different slack waxes, along with oil, petrolatum, pure paraffinic, and scale waxes can be emulsified for use as sizing agents.

The term "biowax" refers to a broad category of animal- or plant-derived waxes made of unhydrogenated, partially hydrogenated and fully hydrogenated fats and oils. Examples include partially or fully saturated beef tallow, vegetable fats and oils, or oils derived from a variety of other plant based sources (for example, nuts, soy, sunflower, palm, corn, seeds, castor oil, or palm oil). The term "synthetic wax" generally refers to alpha olefins that are derived from polymerized ethylene or propylene.

In the wax-extender emulsion, the organic extender may include individual components or blends of lignocelluloses, lignin materials, lignocellulosic agricultural residue, non-lignocellulosic agricultural materials (starches), lignin derivatives or mixtures thereof. As used herein, the term "lignocelluloses" refers to the collection of biopolymers that make up plant material cell walls. The term "lignocelluloses" includes the three broad polymer categories that are present in plant cell walls, namely cellulose, hemicelluloses and lignin. As used herein, the term "lignin material" refers to one or more byproducts of a pulping process, which is recovered during or after pulping of lignocellulosic material. The term "lignin material" is used because the lignin may be extracted in a variety of ways, each of which can alter the chemistry, purity, molecular weight and reactivity of the lignin. The pulp can be from any suitable lignocellulosic material including hardwoods, softwoods, annual fibers, and combinations thereof. Exemplary pulping processes include kraft pulping, sulfite pulping processes, organosolv pulping processes, soda pulping, enzymatic hydrolysis, super critical water extraction process, and biomass disintegration. More specific examples include kraft pulping, sulfite pulping, ASAM organosolv pulping, acid hydrolysis, Alcell® pulping, Organocell pulping, Acetosolv pulping, lignin extraction from an enzymatic hydrolysis process, super critical water extraction process and any other biomass disintegration process. In a preferred embodiment, the lignin material includes one or more byproducts of kraft pulping. For example, the lignin material may comprise dewatered kraft lignin. The term "lignocellulosic agricultural residue" refers to pulverized, ground or powder forms of agricultural residue. Lignocellulosic agricultural residue may comprise ground, pulverized, or powder forms of tree bark, wood flour, nut shells, seed hulls, corn cobbs, sugar beet residuals, sugar cane residuals, and mixtures thereof. Non-lignocellulosic agricultural residue may comprise proteinaceous and amylaceous flours, such as wheat flour, wheat bran, corn flour, corn starch, rice flour, and soy flour or mixtures thereof. As used herein, the term "lignin derivatives" refers to lignin material that has been derivatized with additional chemical functional groups, such as lignosulfonates.

The organic extender is typically insoluble in water. If the extender material is water-soluble (e.g., organosolv lignin materials), the water soluble component will associate with the continuous water-phase in the emulsion. In a system where the extender is associated with the continuous water phase, the extender is free to migrate with the water once applied to wood furnish (e.g., OSB strands or particleboard furnish), and may not remain associated with the wax. This migration would result in a situation where the extender cannot provide enhanced resin effectiveness at overlapping wax and resin locations.

The wax-extender emulsion can comprise from 2 wt % to 30 wt % organic extender. Thus, the wax-extender may comprise organic extender in an amount from 3 wt %-29 wt %, from 5 wt %-28 wt %, from 8 wt %-27 wt %, from 10 wt %-26 wt %, from 12 wt %-25 wt %, from 14 wt %-25 wt %, from 16 wt %-24 wt %, from 16 wt %-22 wt %. For example, the emulsion may comprise organic extender in an amount up to 5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, and 30 wt %, with a minimum concentration of 2 wt %.

The organic extender, surfactant package (also referred to as soap) and wax component combine to account for the total solids in the wax-organic extender. The wax-organic extender emulsion may comprise 30 wt % to 70 wt % total solids. Thus, the wax-organic extender emulsion may comprise 30 wt %-70 wt %, 32 wt %-68 wt %, 34 wt %-66 wt %, 36 wt %-64 wt %, 38 wt %-62 wt %, 40 wt %-60 wt %, 42 wt %-60 wt %, 44 wt %-60 wt %, 46 wt %-60 wt %, 46 wt %-58 wt %, 46 wt %-56 wt %, 46 wt %-54 wt %, or 40%-52 wt %. For example, the wax-organic extender may comprise from 30 wt % up to 32 wt %, up to 34 wt %, up to 36 wt %, up to 38 wt %, up to 40 wt %, up to 41 wt %, up to 42 wt %, up to 43 wt %, up to 44 wt %, up to 45 wt %, up to 46 wt %, up to 47 wt %, up to 48 wt %, up to 49 wt %, up to 50 wt %, up to 51 wt %, up to 52 wt %, up to 53 wt %, up to 54 wt %, up to 55 wt %, up to 56 wt %, up to 57 wt %, up to 58 wt %, up to 59 wt %, up to 60 wt %, up to 62 wt %, up to 64 wt %, up to 66 wt %, up to 68 wt %, or up to 70 wt % total solids.

In the wax-extender complex, the surfactant co-associates with and surrounds the closely associated wax component and organic extender component thereby forming the wax-extender complex. Any surfactant capable of emulsifying and stabilizing the wax component and the organic extender component to form a wax-extender complex is suitable for use as a surfactant; this includes cationic, anionic and nonionic surfactants. In an exemplary embodiment, the surfactant is a reaction product of two or more components that interact with one another to form the surfactant. For example, surfactant components may comprise a first surfactant component such as a fatty acid, a lignosulfonate, or a montan wax and a second surfactant component such as an inorganic base or an organic base that reacts with the first component to form a surfactant. For example, the emulsion surfactant may comprise the reaction product of a fatty acid and an inorganic base. A typical fatty acid structure may include a hydrophilic, carboxylic acid head with a hydrophobic, aliphatic chain capable of complexing and forming a surfactant with a base compound. Exemplary fatty acids may include C12 to C22 fatty acids. Thus, the first component may include fatty acids such as lauric acid, palmitic acid, stearic acid, behenic acid, oleic acid, linoleic acid, linolenic acid, isomers thereof or mixtures thereof. The wax-extender emulsion may comprise from 0 wt % to 5 wt % of the first component. For example, the wax-extender emulsion may comprise up to 0.5 wt %, 1 wt %, 1.5 wt %, 2 wt %, 2.5 wt %, 3 wt %, 3.5 wt %, 4 wt %, 4.5 wt % or 5 wt % fatty acid. The second surfactant component may comprise an inorganic base or an organic base. In an embodiment, an inorganic base may comprise a mono-functional amine, a multi-functional amine, a cyclic amine, an alkali metal salt, an alkaline earth metal salt, ammonia or combinations thereof. A base can be chosen based on its efficacy with the compound being used as the first surfactant component (e.g., fatty acid). Exemplary amine bases include a tri-functional amine such as triethanolamine (TEA) and a cyclic amine such as morpholine. Additional exemplary bases may include sodium hydroxide, potassium hydroxide, monoethanolamine (MEA), ammonia, and 2-Amino-2-Methyl-1-Propanol Solution (AMP95). The wax-extender emulsion may comprise from 0 wt % to 5 wt % of the second component. For example, the wax-extender emulsion may comprise up to 0.5 wt %, 1 wt %, 1.5 wt %, 2 wt %, 2.5 wt %, 3 wt %, 3.5 wt %, 4 wt %, 4.5 wt % or 5 wt % base.

The wax-extender emulsion may also comprise a defoamer and a pH modifier. The defoamer can reduce or release entrained air that is brought into the emulsion by other components or through mixing. The defoamer may comprise a water-based defoamer, a silicone-based defoamer, a silicone-free defoamer, an oil-based defoamer, a polymer-based defoamer, or mixtures thereof. For example, the defoamer may comprise a blend of mineral oil and silica derivatives. The amount of defoamer may be adjusted based on choice of defoamer and extender. In exemplary embodiments, the defoamer may be present in the wax-extender emulsion in an amount of 0 wt % to 1 wt %. For example, defoamer may be present in amounts of up to 0.1 wt %, 0.2 wt %, 0.3 wt %, 0.4 wt %, 0.5 wt %, 0.6 wt %, 0.7 wt %, 0.8 wt %, 0.9 wt %, or 1 wt % of the emulsion.

The pH modifier may comprise one or more compounds added to the emulsion production process at the same time or at different times. The pH modifier can act as a pH adjuster and a dispersant. For example, the pH modifier can aid with the consistency of the emulsion or components being mixed and with the dispersion of extender. Additionally, different surfactant components are more stable and perform better at different pH ranges. Thus, the pH modifier can help with formation of surfactant by achieving pH conditions favoring reaction of the first surfactant component and the second surfactant component. For example, when the first component is a fatty acid and the second component is an amine base, other components in the wax-extender emulsion may have a pH that alters the overall pH of the mixture, making it difficult for the fatty acid and the amine base to react completely without the addition of a pH modifier.

The pH modifier may comprise a mono-functional amine, a multi-functional amine, an alkali metal salt such as a metal hydroxide, an alkaline earth metal salt or combinations thereof. For example, the pH modifier may comprise sodium hydroxide or sodium carbonate. The amount of pH modifier used in the wax-extender emulsion is variable and can be adjusted based on the needs of the components of the emulsion. In exemplary embodiments, the pH modifier may be present in the wax-extender emulsion in an amount of 0 wt % to 1 wt %. For example, pH modifier may be present in amounts of up to 0.1 wt %, 0.2 wt %, 0.3 wt %, 0.4 wt %, 0.5 wt %, 0.6 wt %, 0.7 wt %, 0.8 wt %, 0.9 wt %, or 1 wt % of the emulsion.

An exemplary embodiment of the wax-extender emulsion may comprise 30 wt % to 60 wt % petroleum-based wax, 5 wt % to 20 wt % lignin material, the reaction product of a C12-C20 fatty acid and a complimentary tri-functional amine as the surfactant, a blend of mineral oil and silica derivatives, and sodium carbonate and sodium hydroxide.

The wax-extender emulsion may include additional suitable additives or components, such as, for example, biocides, pigment, indicator dye, and/or wetting and dispersing agents, depending on the performance needs of the product. The wax-extender emulsion may also be formulated and used as a delivery mechanism for other components into the wood composite blending process, depending on need and application.

Advantageously, the process for producing the wax-extender emulsion results in both the wax component and the organic extender component being stabilized by the surfactant to form wax-extender complex particles suspended in the continuous water phase of the emulsion. In the production process, the organic extender component is added to the mixture to be emulsified before emulsification and homogenization. Thus, the organic extender component is emulsified with and homogenized with the wax component. A wax-extender complex is formed prior to cooling the emulsion, and thus prior to solidification of the molten wax component in the wax-extender complex. In contrast, extenders that are added to an emulsion after cooling and solidification are not physically able to closely associate with the wax component.

FIG. 1 provides a schematic representation of the process for producing the wax-extender emulsion. The process includes introducing water to the vessel or container where the emulsion will be formed, wherein the water is at a temperature greater than the melting point of the wax component, but below the boiling point of water (35° C. to 95° C.); introducing organic extender to the vessel; introducing the components that form the emulsion surfactant to the vessel; and introducing a molten wax component to the vessel. In an exemplary embodiment, water is the first component introduced to the vessel. Those skilled in the art will recognize that wax emulsions may be prepared with adjustments to the order of component introduction, but that all components will be molten, homogeneously combined, and the surfactant will be present prior to emulsification, homogenization and cooling. Further, in the process described herein, the extender is introduced prior to the emulsification, homogenization and cooling stages, as depicted in both FIGS. 1 and 2. The temperature range for molten wax varies with the wax component being used. An exemplary temperature range includes 35° C. to 100° C. As can be seen in FIG. 1, pH modifier and/or defoamer may also be added to the vessel. Introduction of these components is optional.

The wax-extender emulsion is formed by mixing at least water, organic extender component, surfactant-forming components, and molten wax. During formation of the emulsion, the wax component, the surfactant and the water are in the liquid phase. The molten wax component and organic extender particles are reduced in size by mixing in the presence of surfactant particles. The surfactant aids in homogeneously dispersing the molten wax and organic extender in the continuous water phase at elevated temperatures and aids in preventing re-agglomeration. The wax component and the organic extender component are closely associated with one another and with the surfactant, which also stabilizes the wax and extender components. A wax-extender complex, which includes a homogenous mixture of organic extender particles and wax particles surrounded and stabilized by surfactant, is formed. Because the wax particles remain molten at this stage, the solid extender particles closely associate with the molten wax particles.

High shear and mixing are imparted on the wax-extender emulsion while the emulsion is still hot thereby producing a homogenous mixture of similarly sized fine molten particles of wax and fine solid particles of organic extender. The fine molten wax particles are suspended in the continuous water phase. The fine, solid extender particles are suspended in both the molten wax and continuous water phases. Exemplary high shear mixers that can be used include a high shear, single or multi-stage homogenizer, a high-speed mixer, and a rotor-stator. Any device capable of inducing a high degree of shear and mixing on the wax-extender emulsion is suitable for use.

The wax particles begin to solidify as the emulsion mixture cools. The surfactant surrounds the wax particles and the organic extender particles that are homogeneously sized and homogenously mixed and dispersed in the water phase thereby forming wax-extender complexed particles comprising both wax and organic extender, which are stabilized in the water phase.

The organic extender can be introduced to the emulsion vessel in the form of a dry powder, an agglomerated material, an organic extender slurry, or combinations thereof. In an exemplary embodiment, a slurry of the organic extender may comprise water, organic extender, defoamer, and pH modifier. The water may be present in an amount from 10 wt % to 60 wt % of the extender slurry. The amount of water in the slurry can vary depending on the organic extender being used, including the moisture content of the extender. As discussed in greater detail above, the organic extender may include individual components or blends of lignocelluloses, lignin materials, lignocellulosic agricultural residue, non-lignocellulosic agricultural materials, lignin derivatives or mixtures thereof. Organic extender may be present in an amount of 20 wt % to 90 wt % of the extender slurry depending at least in part on the moisture content of the extender material, the desired viscosity of the slurry, and the desired final emulsion solids and fill level. For example, the organic extender may be present in an amount of 20 wt % to 70 wt % of the slurry. An exemplary organic extender may comprise dewatered, kraft lignin.

Defoamer is optional and may include any of the defoamers listed above, such as, for example, water-based, silicone-based, and mineral oil based defoamers. The defoamer may be present in an amount of up to 1 wt % of the extender slurry. The defoamer can be introduced to the emulsion production process as a component of the extender slurry, as an independent component to the emulsion vessel, or both, depending on operating conditions and the desired product. The pH modifier is also optional and may include any of the pH modifiers listed above, such as, for example, alkali salts. The pH modifier may be present in an amount of up to 1 wt % of the extender slurry. The pH modifier can be introduced to the emulsion production process as a component of the extender slurry, as an independent component to the emulsion vessel, or both, depending on processing needs and specific compounds used in the emulsion production process.

Figure 2:
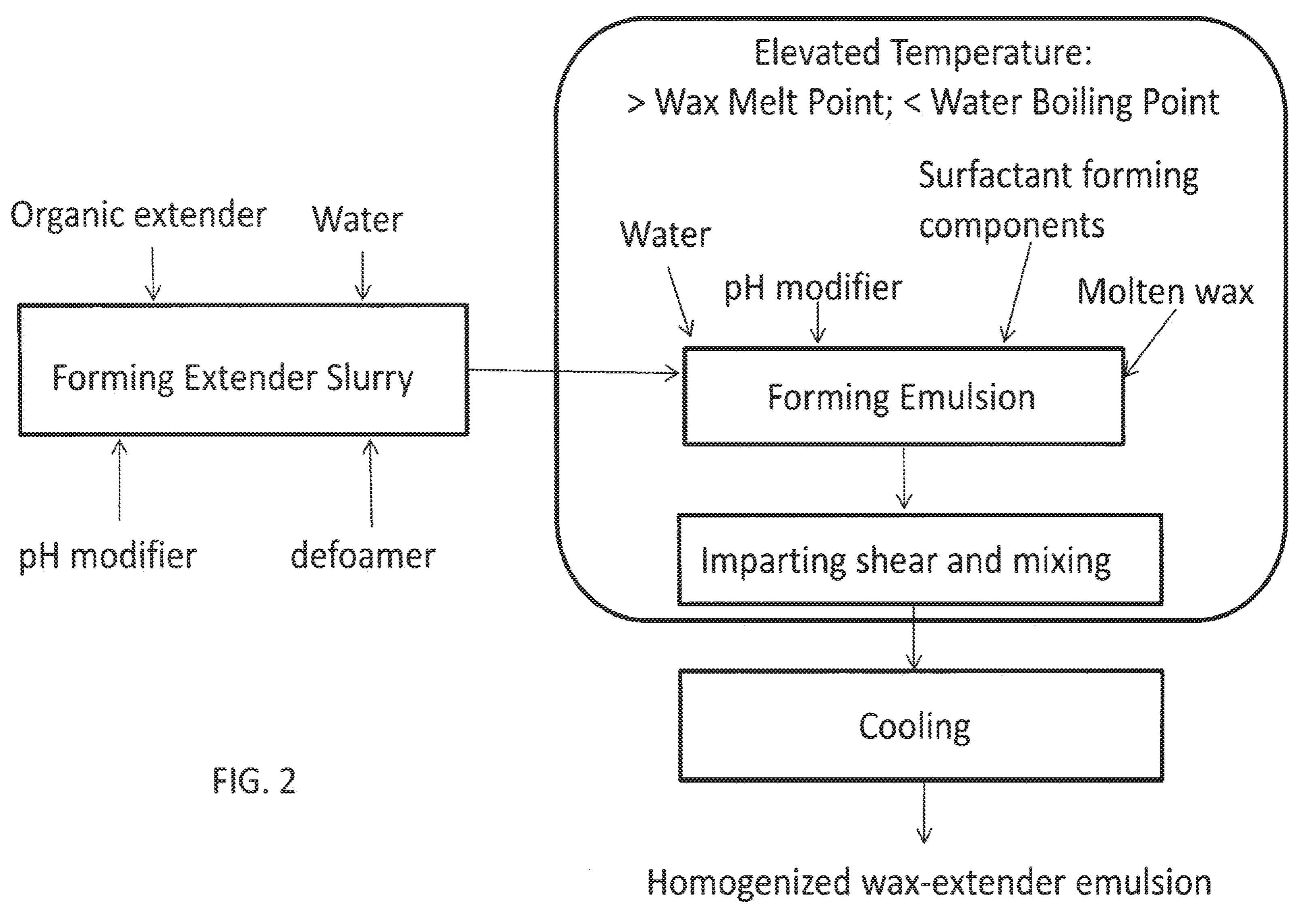
FIG. 2 is another schematic representation of a process for manufacturing an exemplary embodiment of a wax-extender emulsion in accordance with an aspect of the present invention.

FIG. 2 provides an exemplary schematic representation of the process for producing the wax-extender emulsion wherein the organic extender is added in the form of an organic extender slurry. To prepare the organic extender slurry, the water, organic extender, defoamer, and pH modifier can be combined in a vessel and mixed. Depending on various operating conditions, including, for example, the type of organic extender used, combining and mixing may include imparting high shear on the mixture. For example, a homogenizer, a high-speed mixer, or a rotor-stator could be used to impart high shear on the extender slurry mixture.

The organic extender slurry is added to the emulsion vessel along with water, molten wax, and surfactant forming components prior to emulsification and prior to high shear mixing. As shown in FIGS. 1 and 2, the organic extender in slurry form can be added to the emulsification vessel at the same time in the process that organic extender in powder form can be added to the emulsification vessel.

Adding the organic extender to the emulsification vessel prior to emulsification and high shear mixing enables formation of wax-extender complex particles comprising both wax particles and organic extender particles. If organic extender is added to an emulsification mixture after emulsification and cooling takes place, the organic extender particles cannot closely associate with the wax and surfactant particles to form the wax extender complex.

Figure 3:
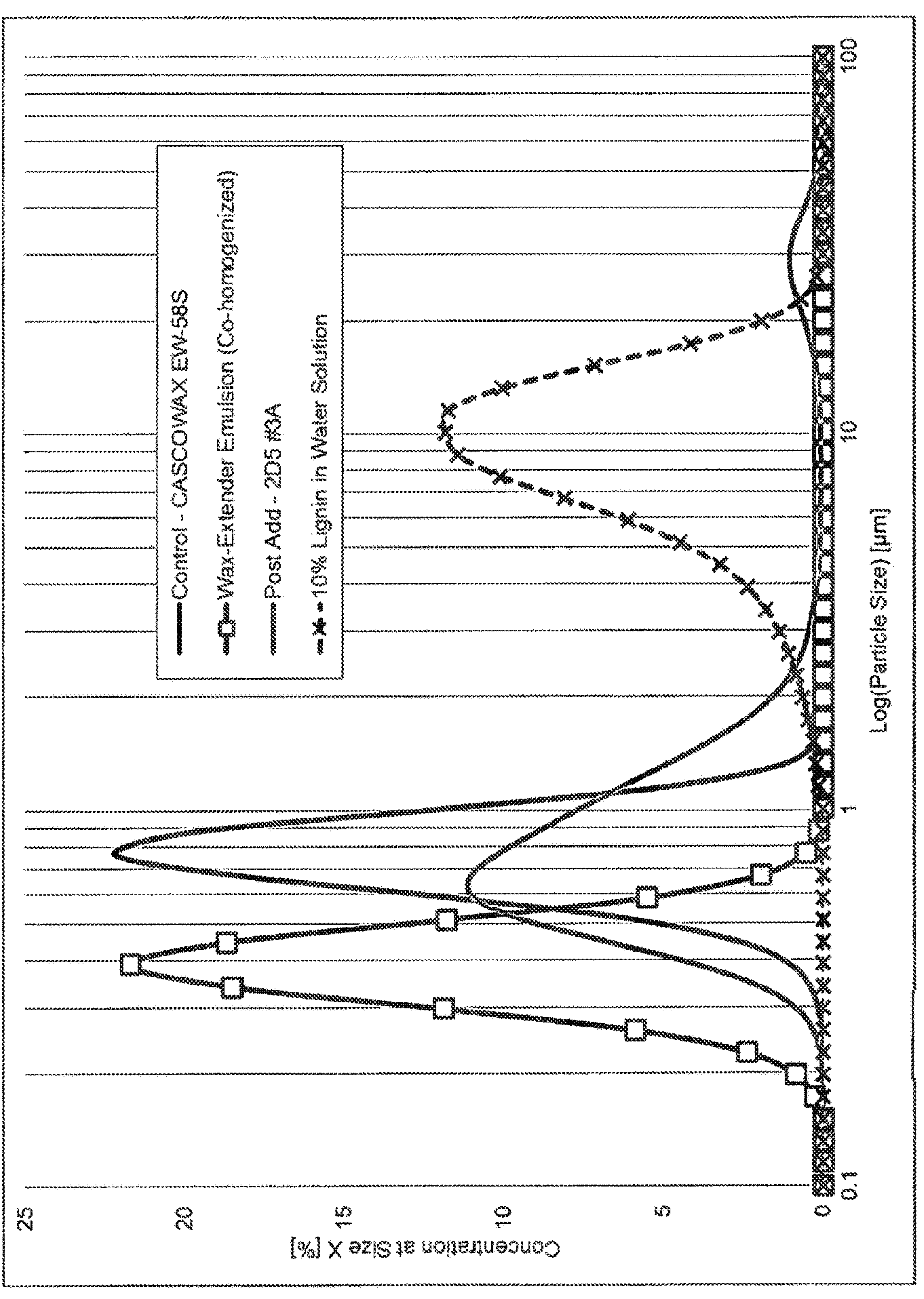
FIG. 3 is a graphical representation of particle size distribution curves related to Example 1.

As shown with the particle size distribution curves of FIG. 3, a wax-extender emulsion wherein wax, extender, and surfactant are closely associated with one another has different physical characteristics than a wax emulsion wherein organic extender is not closely associated with wax and surfactant particles. FIG. 3 shows a particle size distribution curve for an exemplary embodiment of a wax-extender emulsion. Additionally, particle size distribution curves are shown for a control emulsion, which does not contain an extender, and a liquid solution of the extender material dispersed in water. As shown in FIG. 3, the wax-extender emulsion curve has a single, narrow peak, which represents a uniform particle size distribution for the wax-extender emulsion. As seen in FIG. 3, the exemplary particle size for this system is around 0.4 μm. The narrow and uniform particle size distribution curve exhibits that the organic extender is homogenously sized with and mixed with the wax component in the wax-extender emulsion. In contrast, the curve labeled "Post Add 2D5 #3A" shows a particle size distribution curve for a system where the organic extender material was added to the same control emulsion as shown in FIG. 3, after emulsification and cooling of the wax component. Thus, the organic extender material was not homogenized with the molten wax component in the control emulsion. The Post Add distribution curve has a broad primary peak at 0.6 μm and a smaller secondary peak at 30 μm. Multiple peaks indicate heterogeneity in particle sizes, which suggests that the organic extender particles are not similarly sized to the wax component particles. Homogenizing the extender material at the same time as the wax component, in the presence of surfactant prior to cooling, helps to reduce extender particle size and to encourage similar sizing of wax particles and extender particles.

Figure 4A:
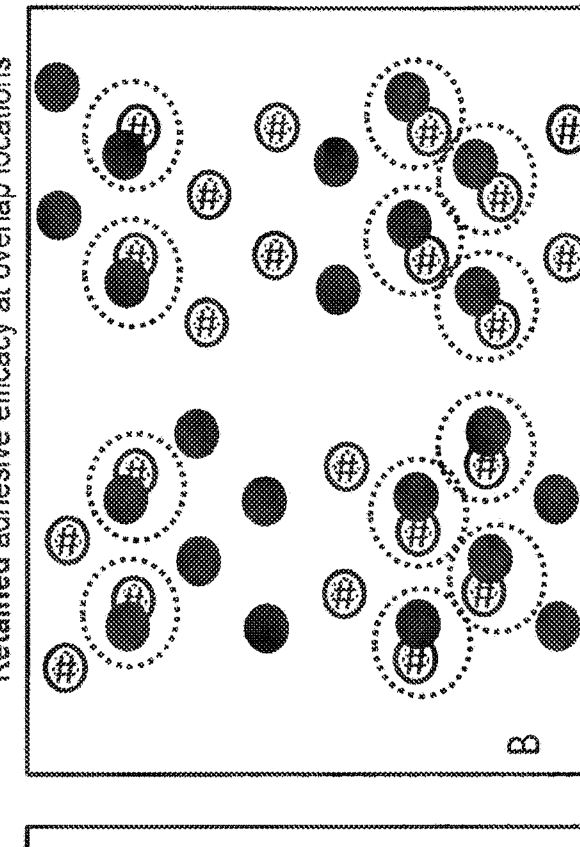
FIG. 4A is a schematic representation of conventional wax emulsion droplets and resin droplets applied on a wood substrate.
Figure 4A:
Figure 4B:
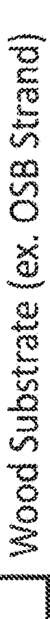
FIG. 4B is a schematic representation of wax-extender emulsion droplets and resin droplets applied on a wood substrate.

Conventionally, when manufacturing wood-based composites, wax emulsions are sprayed onto wood fibers, strands or particles (or other suitable wood material used for making wood-based composites, hereafter collectively referred to as "wood furnish"). After the water component of the emulsion penetrates the wood or evaporates, the resulting wax droplets remain on or near the wood surface. The effective area of each wax droplet is related to the original particle size after homogenization. By co-homogenizing the organic extender and the wax component prior to cooling, the organic extender is homogeneously sized and complexed with the wax component and is thus present with each wax droplet on the wood surface. As shown in FIGS. 4A and 4B, the presence of organic extender with the wax droplet aids in compatibilizing the wax component with adhesive resins used in manufacturing the wood-based composite.

Additionally, during the manufacturing process the wood strands that are sprayed with wax emulsion are also blended with hydrophilic adhesive resins. Conventionally, the resin component and wax component are applied separately because of incompatibility between the two. The order of application is interchangeable, and may be simultaneous; however, both materials are applied independently. Inevitably some resin droplets overlap with some wax droplets during the manufacturing process. When a conventional wax emulsion is used, the overlap locations decrease the effective adhesion between two adjacent wood strands. In contrast, when the wax-organic extender emulsion is used, the hydrophilic, polar organic extender in the wax-extender emulsion reduces the detrimental effect of the overlap locations thereby increasing the effective adhesion between two adjacent wood strands (see FIG. 4B). The hydrophilic and polar nature of the organic extender aids in compatibilizing the wax and the resin at overlap locations.

The increased compatibility between the resin and the wax-extender emulsion, provides manufacturing and performance benefits. For example, the wax-extender emulsion can be co-applied with resin rather than requiring a separate application process. Co-application provides performance advantages and cost efficiencies that are discussed more fully below.

Combining wax emulsions and resins prior to application has traditionally been avoided. The two systems are incompatible, which can cause reactions and emulsion instability, thereby leading to significant viscosity increase and build-up in equipment. Indeed, examples presented below show a control wax emulsion is not compatible with some resins. As shown in the examples, a mixture of the two materials readily phase separates, and if continually mixed, a reaction progresses, resulting in a significant viscosity increase. In contrast, the wax-extender emulsion described herein can form a compatible system with a resin after mixing, thus enabling co-application of the wax-extender emulsion and the resin. Simultaneous, co-application of a wax component and resin component can improve distribution of each individual component, which can result in more effective coverage, and thus increased performance for both the wax component and the resin.

Figure 5:
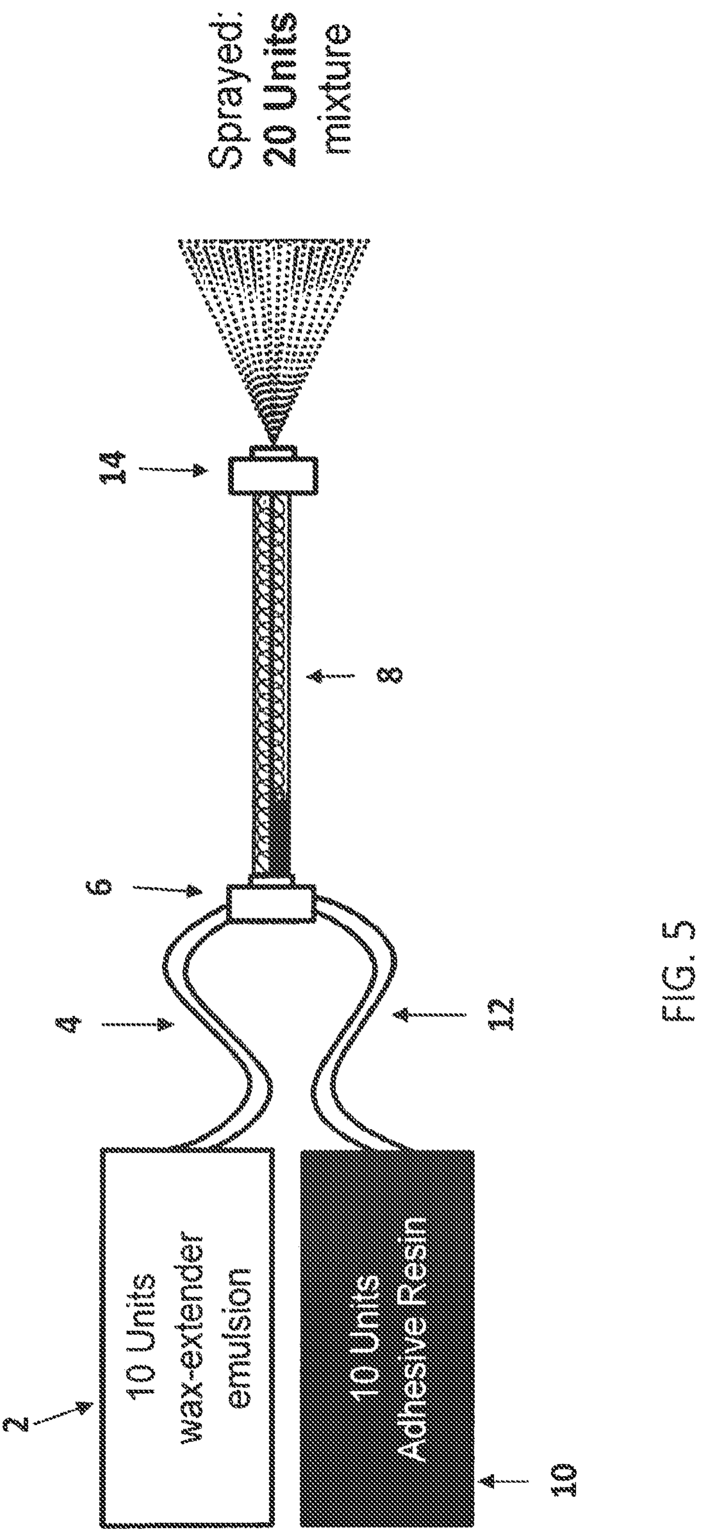
FIG. 5 is a schematic diagram illustrating how a wax-extender emulsion in accordance with an aspect of the present invention and a resin component can be mixed and co-applied to wood furnish.

Devices suitable for in-line mixing the wax-extender emulsion and the resin will be known to one of ordinary skill in the art. An exemplary device is a static mix tube. FIG. 5 provides a schematic diagram illustrating how the wax-extender emulsion and resin component can be mixed and then co-applied to wood strands or other wood furnish for manufacturing wood-based composites. As can be seen, the wax-extender emulsion component exits holding container 2, passes through conduit 4 and enters manifold 6, which then feeds the wax-extender emulsion to static mix tube 8. Similarly, the resin component exits holding container 10, passes through conduit 12 and enters manifold 6, which feeds the resin to static mix tube 8. The wax-extender emulsion and resin are intimately mixed in the static mix tube 8. The wax-extender emulsion/resin mixture exits the static mixing tube 8 via a spraying device 14, which sprays droplets containing a mixture of wax-extender emulsion and resin onto wood strands or furnish.

Figure 6:
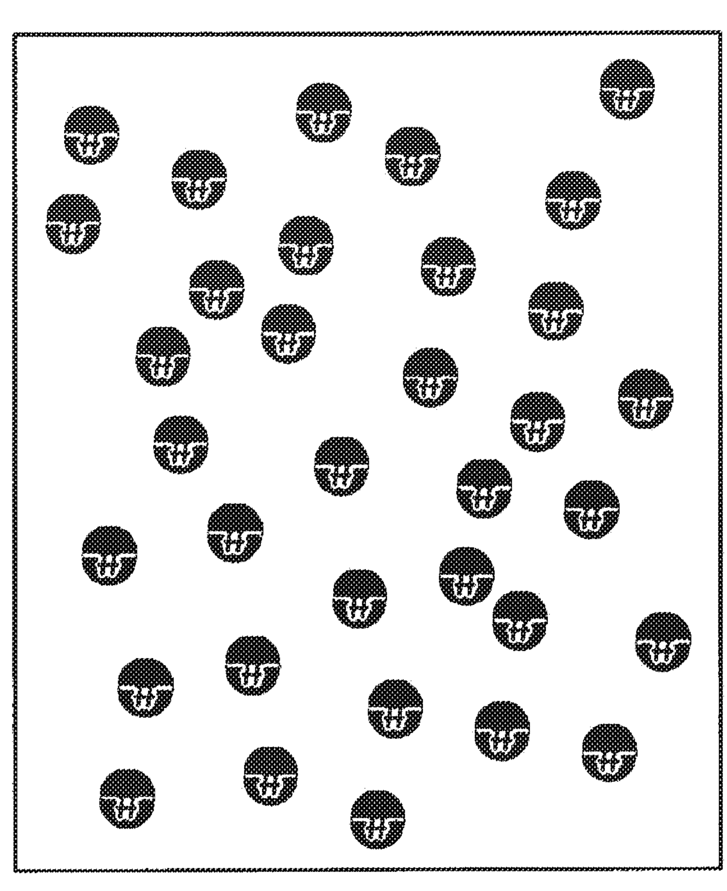
FIG. 6 is a schematic diagram representation of the distribution on wood strands of simultaneously, co-applied resin and extended-wax emulsion as described herein.

FIG. 6 provides a schematic diagram illustrating the distribution on wood strands of simultaneously, co-applied resin and extended-wax emulsion. FIG. 6 can be compared to FIG. 4B, which shows the distribution of resin and wax-extender when each component is applied separately. As described above, when the components are applied separately, the wax-extender droplets and resin droplets overlap one another in places. As shown in FIG. 6, when resin and wax-extender emulsion are simultaneously co-applied as a mixture, each sprayed droplet contains both components thus enabling better, more complete distribution for both the wax-extender emulsion and the resin.

Distribution of a mixture of wax-extender emulsion and resin is improved relative to separate application of the same components. Thus, more complete component distribution can be achieved without increasing the volume of components being used. For example, 10 units of resin and 10 units of wax-extender emulsion can be applied separately or can be simultaneously, co-applied as a mixture. Better distribution is achieved with the same 20 units of components when the components are applied as a mixture. In fact, distribution is improved to such an extent that when a mixture of wax-extender emulsion and resin is applied, the volume or amount of at least one of the components (for example, the resin) can be reduced without sacrificing performance. For example, the amount of resin used may be reduced by between about 1% and about 30%. In particular, the amount of resin used may be reduced by about 1%, 5%, 10%, 15%, 20%, 25%, or 30%. Similarly, the amount of wax-extender emulsion used may also be reduced without sacrificing performance. For example, the amount of wax-extender emulsion used may be reduced by between about 1% and about 30%. In particular, the amount of wax-extender emulsion used may be reduced by about 1%, 5%, 10%, 15%, 20%, 25%, or 30%.

Additionally, the wax-extender emulsion provides a safety benefit during the wood composite manufacturing process. Wood composite manufacturers require waxes used during production to have a relatively low volatility. Volatility can be quantified by measuring the flash point temperature of the wax. Flash point temperature can be determined by heating a slack wax until it begins to produce a flammable vapor and then measuring the lowest temperature at which a small test flame passing over the surface of the wax causes the vapor to ignite. A well-recognized and commonly used method for measuring wax flash point is the Cleveland open-cup (COC) flash point measurement method. The COC flash point measurement is standardized as ASTM D92.

Flash point temperature requirements limit the types of slack waxes that can be used directly, or in water-based wax emulsions for certain wood composite manufacturing. Advantageously, the wax-extender emulsions described herein suppress the volatility of the wax component relative to conventional emulsions made with the same base slack wax. For example, the volatility for slack wax A may be too high for the wax to be used in certain wood composite applications (that is, slack wax A has a low flash point temperature). Consequently, a conventional wax emulsion made with slack wax A would have higher volatility (that is, volatilize at lower temperatures). In contrast, if an exemplary embodiment of the wax-extender emulsion described herein were prepared with slack wax A, the volatility of slack wax A in the exemplary wax-extender emulsion would be reduced relative to the volatility of slack wax A in a conventional wax emulsion. Reduced volatility means that the wax component volatilizes at a higher temperature (also referred to herein as "peak wax component volatility temperature") thereby providing increased safety. Peak wax-component volatility temperature is strongly correlated with wax flash point temperature.

Because of the multiple components in a water-based emulsion (for example, water, surfactant, and wax), it can be difficult to measure the flash point for the wax component of the water-based emulsion using traditional methods for measuring wax flash point. Thermogravimetric analysis (TGA) can be used to directly measure volatility and degradation for slack waxes and water-based emulsions, providing high resolution and repeatable mass-loss versus temperature data. For water-based emulsions, such as the wax-extender emulsion, TGA results can show temperature regions corresponding with water loss, peak wax volatility (low molecular weight (MW) components vaporize), and wax degradation (higher MW materials break down or burn). As stated above, peak volatility temperatures correlated with flash-point data for individual wax materials.

As shown in the example section below, for molten slack waxes, there is a correlation between the TGA peak volatility temperature and the COC flash point for the corresponding slack wax. Surprisingly, the results showed that the peak wax volatility temperature for a given wax-extender emulsion was higher than the same for the corresponding base wax in a conventional wax-emulsion. The peak volatility temperature for the wax component in a wax-extender emulsion as described herein shifted higher by between about 30-40° C. (50-80° F.). Thus, the peak volatility temperature for the wax component in a wax-extender emulsion as described herein may shift higher by about 1° to about 40° C. Without being bound by theory, this shift is believed to be due to the strong interaction between the extender component and the wax component, which stabilizes the low molecular weight wax component up to higher temperatures.

Comparative testing with samples having simple dilution or filling of a control emulsion with a non-interacting filler (for example, glass bubbles) showed no effect on the peak volatility temperature in a control emulsion. Additionally, comparative testing showed that adding a solution of the extender component to the wax component post emulsion formation did increase the peak wax volatility temperature, but not to the same magnitude as a wax-extender emulsion produced as described herein.

These results indicate that a wax-extender emulsion according to an aspect of the present invention is less volatile, and therefore safer, than conventional wax emulsions prepared with the same base slack wax. Advantageously, this feature of the wax-extender emulsion may broaden the window of available slack wax emulsion systems that a wood composite manufacturer can safely use and may allow for the use of higher volatility base slack waxes that are known to have better water repellency in a panel.

The suppressed volatility of the wax-extender emulsion may explain the thickness swell and water absorption performance benefits seen for the wax-extender emulsion. Without being bound by theory, it is surmised that by being complexed with the wax, the extender aids in stabilizing the higher-volatility components in the slack-wax material, thereby keeping them in the wood composite panel and on the wood, even through high temperature exposure during hot pressing.

EXAMPLES

Example 1

Example 1 provides a comparison of particle size distribution curves for an exemplary embodiment of a wax-extender emulsion as described herein and for an exemplary wax emulsion containing a post-added extender prepared according to conventional methods. In U.S. patent application publication no. 2012/0247617, the organic extender is added to the wax emulsion after the emulsion has been formed (post-added). Methods described in US 2012/0247617 were used to produce the conventional wax emulsions with post-added extender used for comparison with an exemplary embodiment of the wax-extender emulsion described herein.

US 2012/0247617 provides several examples for formulating a wax emulsion with post-added extender. Exemplary formulation 2D5 from Table 9 of US 2012/0247617 was used because the publication indicates that this formula was later used in OSB panel studies.

The exemplary conventional formula was prepared with the same materials described in US 2012/0247617 with the exception of the specific "lignin derivatives." The lignin derivatives described in US 2012/0247617 were unavailable. Instead, kraft lignin was used as the organic extender component in the exemplary conventional wax emulsion. The same organic extender was used for the exemplary embodiment of the wax-extender emulsion described herein. Using the same organic extender for both the conventional wax emulsion and the wax-extender emulsion provides a more direct particle size comparison between the two emulsion compounds. Details not disclosed in US 2012/0247617 were estimated based on reasonable practices in the relevant field of art. Five different versions of the 2D5 example were prepared using different assumptions.

Following formulation, each formula was measured on the HORIBA LA-950 particle size analyzer, and compared against a 58% solids base wax emulsion (control), an exemplary embodiment of a wax-extender emulsion described herein having 47% total solids with 20% of the solids being organic extender, and a water-based solution having 10 wt % of the dewatered, kraft lignin used in the exemplary emulsions. The carrier fluid for particle size analysis was distilled water.

The following materials were used in this example. CASCOWAX® EW-58S (available from Hexion) was used as the control wax-emulsion component, as this was the material used in US 2012/0247617. REAX 85A (available from Ingevity) was used as the lignosulfonate as described in US 2012/0247617. NaOH 50% solids caustic solution, diluted to 7.4% was used as described in US 2012/0247617. Dried and ground kraft lignin, BioChoice™ lignin (available from Domtar) was used as the organic extender.

Example 2D5 from US 2012/0247617 was used for the post-add emulsion formulations. According to the procedure in US 2012/0247617, the stable, conventional wax emulsion was already formed when the organic extender was added. Some details regarding the post-add methods were not clear in US 2012/0247617, and thus 5 different formula options were prepared based on reasonable assumptions and/or techniques alluded to in US 2012/0247617.

In US 2012/0247617, each emulsion started with a lignosulfonate (LS) solution, which was blended with 7.4% NaOH and water to form a LS-NaOH solution. This solution was then added to the 58% solids control wax emulsion. Two points of the procedure were not clear: 1) the amount of LS used in the LS solution, and 2) the way in which the lignin derivatives were added to the EW-58S wax.

The patent describes dissolving the LS in "... a suitable amount of water." Thus, three reasonable possibilities for a suitable amount of water were evaluated: 1) 1.8 wt % LS, 2) 3.0 wt % LS, and 3) 24.69 wt % LS (determined using back calculation from the LS-NaOH solution properties described in Table 7 for example 2D in US 2012/0247617).

Two methods were used to add the lignin component ("lignin derivatives"). In one method (method A), lignin in powder form was added into the emulsion after the LS-NaOH solution using a conventional over-head, high-shear mixer. In the other method (method B), following the approach used in Example 2 of US 2012/0247617, the lignin component was mixed with the LS-NaOH solution at a ratio of 2 parts solution to 1 part lignin solids to form a paste. The paste was then added to the emulsion at a ratio of 3 parts paste to 2 parts emulsion.

Final solids and component concentrations for the 5 exemplary samples are provided in Table 1.

TABLE 1

Solids and component concentrations for the 5 exemplary post-add emulsion samples

| Sample | Measured solids Wt % | Lignosulfonate Wt % | Lignin component Wt % | Wax solids Wt % |
|---|---|---|---|---|
| 2D5-1A | 55.32 | 0.04 | 11.97 | 43.98 |
| 2D5-1B | 50.86 | 0.12 | 20.0 | 23.20 |
| 2D5-2B | 42.92 | 0.20 | 20.0 | 23.20 |
| 2D5-3A | 55.55 | 0.50 | 11.97 | 43.98 |

TABLE 1-continued

Solids and component concentrations for the 5 exemplary post-add emulsion samples

| Sample | Measured solids Wt % | Lignosulfonate Wt % | Lignin component Wt % | Wax solids Wt % |
|---|---|---|---|---|
| 2D5-3B | 42.62 | 1.64 | 20.0 | 23.20 |
| Control EW-58S | 57.95 | 0.00 | 0.00 | 57.95 |

The properties for formula 2D5-3A most closely match the final product 2D5 described in Table 9 of US2012/0247617. These 5 samples were analyzed on the HORIBA particle size analyzer, and compared to the control wax, the wax-extender emulsion (47% total solids, 20% of which were extender-solids), and the powder lignin extender used in both waxes. All particle size analyses were conducted in distilled water.

Figure 7:
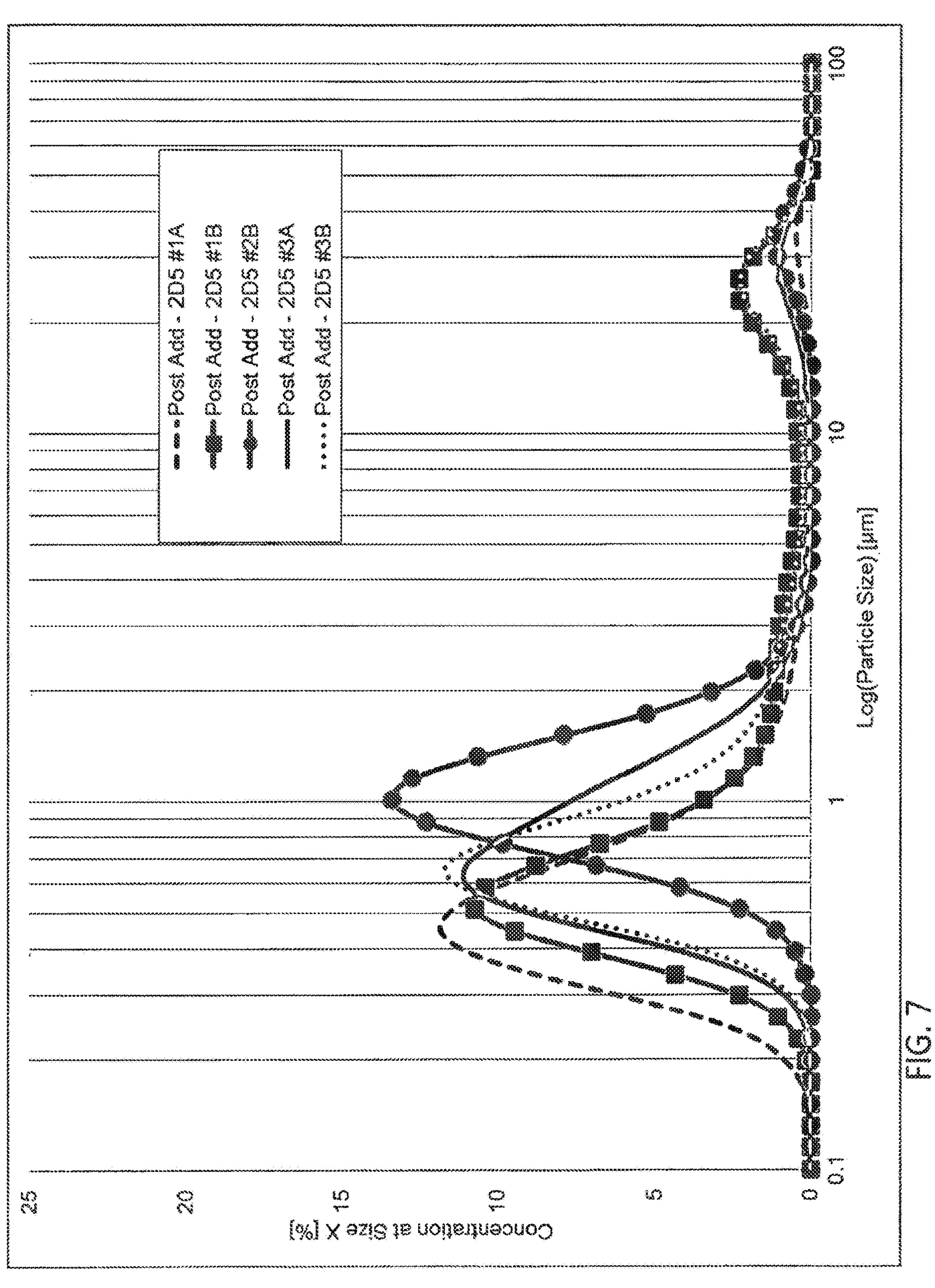
FIG. 7 is another graphical representation of particle size distribution curves related to Example 1.

FIGS. 3 and 7 provide particle size distribution curves for the samples analyzed. FIG. 3 includes particle size distribution curves for the control wax emulsion, which was also used as the base wax emulsion for all five of the Post-Add exemplary samples in Table 1. FIG. 3 also compares the particle size distribution curves for the wax-extender emulsion, a 10% solution of the powder lignin material used as organic extender, and the post-add exemplary sample 2D5 #3A. FIG. 7 compares the same 2D5 #3A curve with the other four post-add exemplary samples from Table 1, prepared based on the teachings from US2012/0247617.

As shown in FIG. 3, the control Cascowax EW-58S and the wax-extender emulsion each had narrow, single-peak particle size distributions centered at and below 1 μm, respectively. The lignin filler (BioChoice™ lignin, available from Domtar) had a much larger particle size and broader distribution. This result is believed to be due to agglomerations of lignin, which are not effectively dispersed without excessively high shear, such as that generated in a homogenizer.

Approximately 20% of the solids in the wax-extender emulsion were the same lignin as shown in the dashed-line curve for the lignin in water solution; however, there was no discernable heterogeneity in the particle size distribution for the wax-extender emulsion.

For the post addition sample 2D5 #3A, shown in FIG. 3, a broad primary peak and a smaller secondary peak were apparent. Having two peaks indicates heterogeneity in particle sizes. FIG. 7 shows the same bimodal peak structure in each of the post addition samples listed in Table 1 as exhibited for 2D5 #3A. Each post addition sample had the same control wax particles and lignin extender shown individually in the particle size distribution curves; furthermore, the lignin extender was the same as used in the 47% solids wax-extender emulsion (FIG. 3).

During the formation of a conventional wax emulsion, both wax and water are liquid and hot (approximately 72-90° C.). Molten wax particles are broken down to a fine particle size in a homogenizer and in the presence of surfactant to prevent re-agglomeration. The surfactant associates with the wax particles separating them from each other, and stabilizing them in the water phase. Upon cooling, the wax particles solidify. Simply adding extender to a room-temperature emulsion comprising surfactant and solid wax particles cannot result in the extender particles closely associating with wax component particles and surfactant in such a way to form a homogeneous wax-extender complex. The distribution curves in FIGS. 3 and 7 support this understanding.

Furthermore, additional potential negative effects can occur from post addition of extender materials to a room-temperature, water-based wax emulsion. Firstly, if the extender material was water-soluble, as is likely the case with the "organosolv" lignin materials described in US 2012/0247617, the water soluble component would associate with the continuous water-phase in the emulsion. In a system where the extender was associated with the continuous water phase, the extender would thus be free to migrate with the water once applied to wood furnish (that is, OSB strands or particleboard furnish), and may not remain associated with the wax. Thus, the extender could not provide enhanced resin compatibility at overlapping wax and resin locations. Secondly, if the extender material comprises insoluble, solid particles that are post added to a conventional wax emulsion, the particles could cause internal abrasion in the fluid system, and potentially damage the protective surfactant structures surrounding the existing wax particles.

In embodiments of the wax-extender emulsion described herein, wherein the organic extender is lignin, during the manufacturing process, the lignin is emulsified with molten wax. The wax-extender emulsion is homogenized to form fine, similarly sized wax-extender complex particles. As the wax-extender emulsion cools and is solidified, the fine and similarly sized wax-extender complex particles remain homogeneously mixed. The narrow, single-peak distribution in FIG. 3 supports this understanding.

Example 2

An exemplary embodiment of a wax-extender emulsion according to an aspect of the present invention was prepared in Example 2. A stable 47 wt % solids wax emulsion was prepared where 20 wt % of the wax solids were replaced with an organic extender. This sample is referred to as "47/20". The same exemplary formula was used in the "Wax-Extender Emulsion" shown in FIG. 3. The wax component was a molten slack wax.

A pre-mix extender slurry having approximately 40% solids was prepared by passing about 1300 g water, about 5.25 g of an oil-based defoamer, about 8.75 g of sodium carbonate and about 1200 g of dewatered kraft lignin that was clumpy and approximately 60% solids through an in-line, high-shear disperser.

A wax emulsion batch kettle was filled with about 1900 g hot water at a temperature between 70-85° C. About 1600 g of the pre-mix extender slurry was added to the batch kettle, followed by about 35 g of 50 wt % NaOH solution while agitating. About 75 g of a fatty acid and a complimentary amount of tri-functional amine were added to the batch kettle to form the surfactant. Molten slack wax at a temperature between 70-95° C. was added to the batch kettle under a moderate degree of turbulent agitation to avoid foaming.

Following wax-extender emulsion formation, the batch was fed through a dual-valve homogenizer to reduce the particle size. Exiting the homogenizer, the wax-extender emulsion was pumped through a cooling coil and a 250 mesh filter bag. The final product properties were as follows: ~275 cps viscosity at 25° C.; pH~7.5, ~47% total solids, 0.94 g/mL density; mean particle size <0.5 μm.

Example 3

In this example, oriented strand board (OSB) panels were prepared using different water-based emulsion systems.

Sample C was an exemplary wax-extender emulsion prepared using the methods described herein, and sample A was a control water-based wax emulsion having no extender. Both emulsions had 47% total solids. For sample C, 20% of the wax solids in the wax-extender emulsion were replaced with extender solids before emulsification, according to the methods described herein. For sample A, the total solids were wax solids.

Southern pine strands were blended with 3% solids liquid phenol formaldehyde (PF) resin by wood weight in the panel face layers, and 1.4% pMDI resin by wood weight in the panel core layers. The wax emulsions were applied at a 1% solids by wood weight to both the face and core for both the control emulsion and the wax-extender emulsion.

A third condition was also prepared, in which sample A was applied at 0.8% solids by wood weight (rather than 1% solids by wood weight). This condition was referred to as Sample B (Δ-20% Application). All liquid application occurred through air spray nozzles into a rotating OSB drum blender. Panels were formed by hand, without orientation, with 27.5% bottom face strands, 45% core strands and 27.5% top face strands. Panels (22"×22"×0.5") were pressed at 215° C. for 3 minutes to a density of 43 lbs/ft$^3$.

Thickness swell (TS), water absorption (ABS) and internal bond (IB) specimens were excised from the panels, and tested according to methods described in ASTM D 1037. The results in Table 2 show improvements in thickness swell (TS) and water absorption (ABS) for the exemplary wax-extender emulsion versus the control wax emulsion. As expected, sample B, with reduced applied wax solids, showed a decrease in thickness swell (TS) and water absorption (ABS) performance. Sample B, however, also showed the best internal bond (IB). It is surmised that this result was achieved because of a reduced amount of wax droplets to interfere with resin overlap, and thus resin efficacy. Sample C had increased internal bond (IB) relative to Sample A, suggesting improved compatibility and adhesion between wax having extender and overlapping resin droplets.

TABLE 2

Combined TS, ABS and IB results for OSB panels of Example 3

| Treatment | | TS [%] (n = 15) AVG | TS [%] (n = 15) STDEV | ABS [%] (n = 15) AVG | ABS [%] (n = 15) STDEV | IB [psi] (n = 40) AVG | IB [psi] (n = 40) STDEV |
|---|---|---|---|---|---|---|---|
| Control Wax Emulsion | A | 19.76% | 3.06% | 25.09% | 4.05% | 65.64 | 19.74 |
| Δ-20% Application | B | 21.34% | 3.65% | 27.56% | 4.12% | 85.91 | 25.23 |
| Exemplary Wax Extender Emulsion | C | 16.17% | 2.43% | 20.76% | 3.05% | 77.70 | 20.23 |

Example 4

Testing was performed to determine the compatibility between an exemplary embodiment of the wax-extender emulsion as described herein and pMDI, which is a commonly used resin. As a control, compatibility between the pMDI and a control wax emulsion was also evaluated. Both wax emulsions had 50% solids however, in the exemplary extended wax emulsion, 20% of the wax solids were replaced with organic extender solids. The control emulsion and wax-extender emulsion were prepared in the manner described previously. In addition to the wax-emulsion samples, a mixture of pMDI and water and pMDI alone were also tested.

Viscosity was measured as an indicator of compatibility and stability, using a Discovery H1 viscometer (Helical geometry, 25° C., 100 s-1, 3600 s). Approximately 20 mL each of the exemplary wax-extender emulsion and pMDI were simultaneously applied through a 4"×¼" helical static mix tube directly into the 50 mL rheometer cup, and the test was immediately started. The mixture viscosity was monitored over a 1-hour test duration. Increases in viscosity were interpreted as either incompatibility (wax kick-out and phase separation) or isocyanate consumption (i.e. reactivity which could lead to pre-cure on wood strands), or a combination of both. The same procedure was used for the control wax emulsion-pMDI mixture and the water-pMDI mixture.

Figure 8:
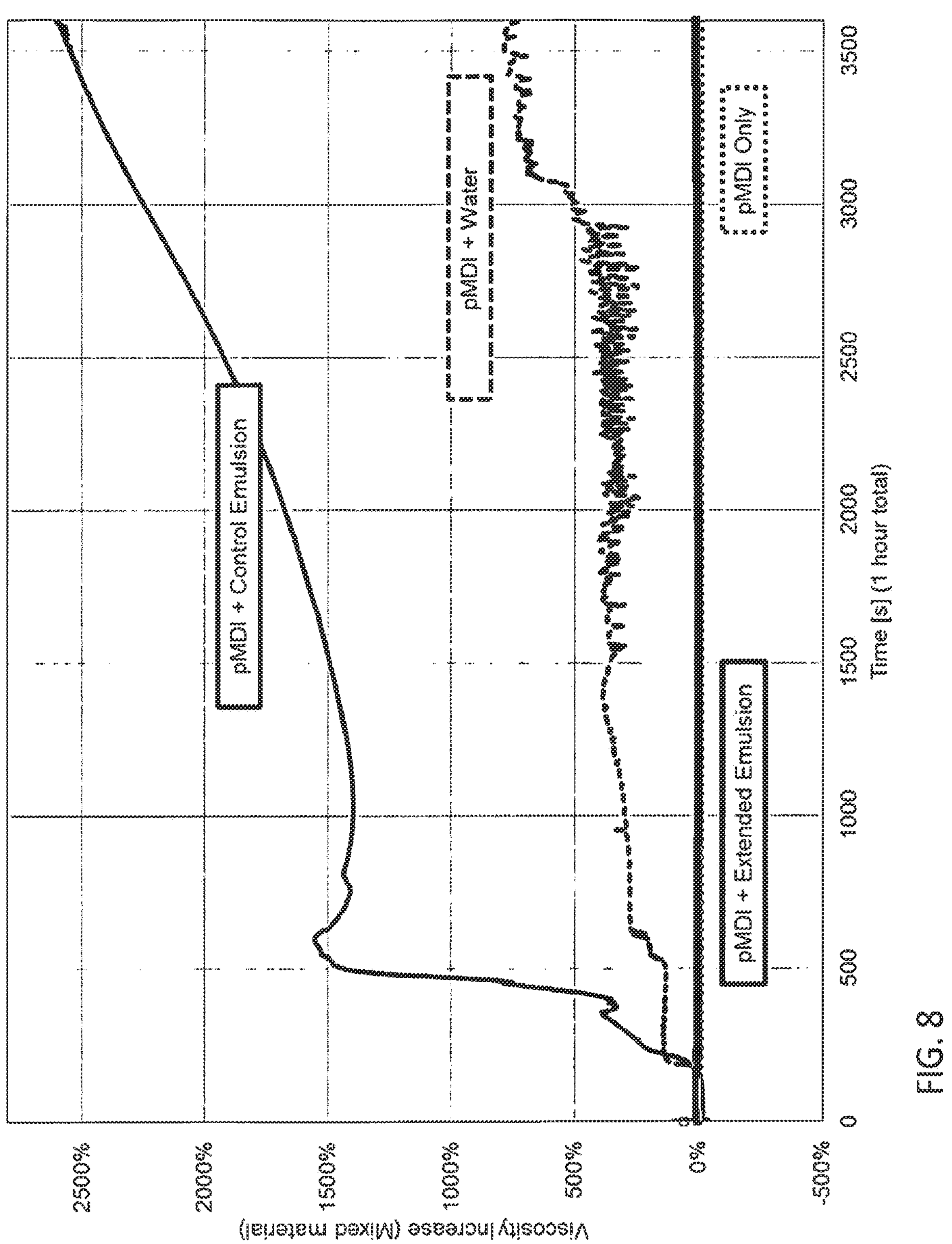
FIG. 8 is a chart showing the change in viscosity over time related to compatibility testing in Example 4.

FIG. 8 provides a chart showing the change in viscosity over the one-hour test period. As can be seen, the control wax emulsion mixed with pMDI showed significant growth in viscosity in a very short span of time. Viscosity increases, such as those seen for the control wax emulsion-pMDI mixture, foreshadow complications due to equipment build-up and/or pre-cure in an industrial process, thus indicating that co-application of a control wax emulsion-pMDI mixture is not practical. Similarly, the results for water mixed with pMDI also increase, and demonstrate an unstable mixture. Again, the reactivity of water with the pMDI isocyanate groups can lead to pre-cure and equipment build-up. However, the rheology results for the mixture of the exemplary wax-extender emulsion and pMDI indicated that the mixed wax-extender emulsion and pMDI could be co-applied. In particular, as shown in FIG. 8, the mixed wax-extender emulsion and pMDI did not increase in viscosity for over an hour under agitation. This behavior was similar to that seen for pMDI alone. Additionally, testing showed that compatibility between the exemplary wax-extender emulsion and pMDI was independent of the base slack wax used in preparing the wax-extender emulsion.

Example 5

Oriented strand board (OSB) panels were produced using exemplary embodiments of the wax-extender emulsion co-applied with pMDI, and the performance of the OSB panels was evaluated. For comparison, OSB panels were produced using an exemplary control wax emulsion and pMDI, which were applied separately.

Single-layer, non-oriented OSB panels were prepared using a 6 ft. diameter, 3 ft. deep rotary drum blender. Southern yellow pine strands (6% moisture) were tumbled at 5 RPM, such that the strands cascaded in front of two spray nozzles. The exemplary wax-extender emulsion was mixed with the pMDI resin in-line via a 4" long by ¼" diameter helical, static mix-tube immediately upstream of the spray nozzles. In contrast, the control wax emulsion and pMDI were applied separately, with independent supply lines leading directly to each spray nozzle.

Both the control emulsion and the exemplary extended wax emulsion had 50% total solids; however, in the extended wax emulsion, 20% of the wax solids were replaced with organic extender.

Four conditions in total were compared. Condition A was the control condition. It represented common, optimal loading levels for pMDI and wax emulsions used in industrial panels. More specifically, pMDI was added at 1.8% based on dry strand weight and wax emulsion was added at 1.0% emulsion solids based on strand weight. In condition A, if loading level were decreased for either resin or wax, moisture resistance and/or mechanical performance of the panel produced would be reduced.

Conditions B-D all included application of an exemplary embodiment of a mixture of the extended wax emulsion with pMDI. The mixture in Condition B had 1.8% pMDI and 1.0% emulsion solids by wood weight. The mixture in Condition C had 10% less pMDI resin (i.e. pMDI applied at 1.62% by wood weight) and 1.0% emulsion solids by wood weight. The mixture in Condition D had 1.62% pMDI by wood weight and 5% additional wax added (i.e. 1.05% wax-extender emulsion solids by wood weight).

During preparation, enough strands were blended per cycle to make two panels. The total time from blending to having the second panel out of the press was about 45 minutes per condition. Single-layer, non-oriented panels (22"×22"×½") were formed by hand with a target density of 43 pounds per cubic foot. One panel was pressed at a time in a 215° C. hot-press for 225 total seconds (30 s to achieve target thickness, 150 s at target thickness, and a 45 s vent stage). A silicone release agent was applied to the caul plates before each panel. The outer 3" perimeter of each panel was trimmed away and discarded. The remaining material yielded three 6 inch×6 inch samples for TS and ABS testing and thirteen 2 inch×2 inch samples for IB testing.

TS and IB samples were evaluated according to methods described in ASTM D 1037. IB specimen faces were lightly sanded.

Collective thickness swell (TS), water absorption (ABS) and internal bond strength (IB) results are presented in Table 3. Statistical analyses determined there were no significant differences in TS, ABS or IB results between each condition. Thus, panels produced with the exemplary wax-extender emulsion, which embodied 20% less wax solids, performed at least as well as panels produced with un-extended control wax. In the case of conditions C & D, the reduction in pMDI did not reduce panel strength or moisture durability was observed even with the sample having a 10% pMDI reduction. Additionally, adding 5% additional wax appeared to reduce further the TS, even with a 10% reduction in pMDI.

Table 3 also shows that simultaneously, co-applying the wax-extender emulsion as a mixture with pMDI met or exceeded the mean IB values relative to the control, even with reduced resin addition. This provides evidence that co-application of wax-extender emulsion and resin as a mixture provides improved distribution, and thus resin efficiency.

The evaluation showed that co-application of wax-extender emulsion and pMDI as a mixture can allow for, at least, a 10% reduction in pMDI while meeting or exceeding control performance for TS, ABS and IB. The performance results for the mixture were at least comparable to control performance.

TABLE 3

Combined TS, ABS and IB results Example 5.

| Treatment | Code | TS [%] (n = 6-12) AVG | TS STDEV | ABS [%] (n = 6-12) AVG | ABS STDEV | IB [psi] (n = 25-52) AVG | IB STDEV |
|---|---|---|---|---|---|---|---|
| Control - Separate - 1.8% | A | 13.96% | 2.01% | 15.63% | 1.98% | 124.84 | 27.87 |
| Extended - Co-Applied - 1.8% | B | 13.50% | 1.17% | 14.82% | 1.46% | 124.89 | 30.37 |
| Extended - Co-Applied - 1.62% | C | 13.41% | 0.99% | 15.26% | 1.92% | 130.18 | 22.65 |
| Extended - Co-Applied - 1.62% + 5% additional wax (1.05%) | D | 12.45% | 0.95% | 14.72% | 1.29% | 129.04 | 19.58 |

While, significant differences were not detected between any of the conditions, the results show that using a wax-extender emulsion applied as a mixture with pMDI as described herein improved TS relative to separately applied, un-extended control wax. Furthermore, no increase in TS

Example 6

Thermogravimetric Analysis (TGA) was performed to evaluate volatility of exemplary embodiments of the wax-extender emulsion described herein. Samples of different slack waxes were compared using the TGA method alongside the Cleveland Open Cup (COC) flash point method described in ASTM D 92. The COC method is typically used as a screening tool to determine the volatility, and thus safety, for different slack wax systems. It is inherently difficult to measure the flash point for a water-based wax emulsion, and thus the base slack wax flash point is often used to describe the emulsions made from the base waxes. However, the TGA method provides a direct measurement of volatility.

Testing showed a strong correlation between the peak temperature corresponding to the wax volatility observed in the TGA data, and the flash point detected with the COC method. After establishing the correlation, the TGA data was used to show that the presence of the extender in the wax-extender emulsion increased the temperature corresponding with the wax volatility. It was further demonstrated that volatility suppression is unique to the extender being complexed with the wax particles during emulsion formation. This result was demonstrated by samples having post added fillers. The post added fillers included the same extender material that was used in the exemplary embodiment of the wax-extender emulsion and 3™ glass bubbles S32 in water.

Figure 9:
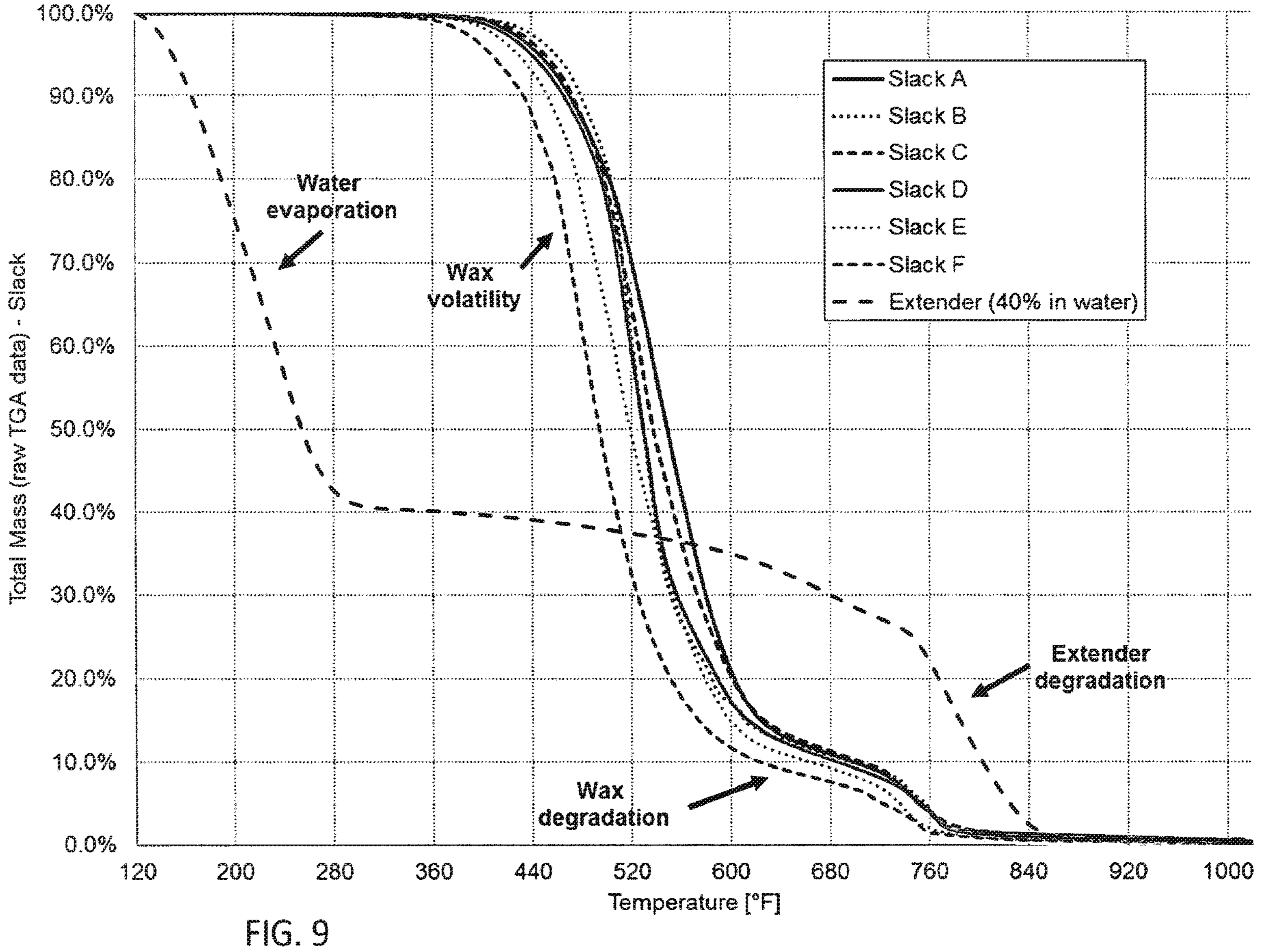
FIG. 9 is a chart showing TGA curves for six slack waxes in Example 6.
Figure 10:
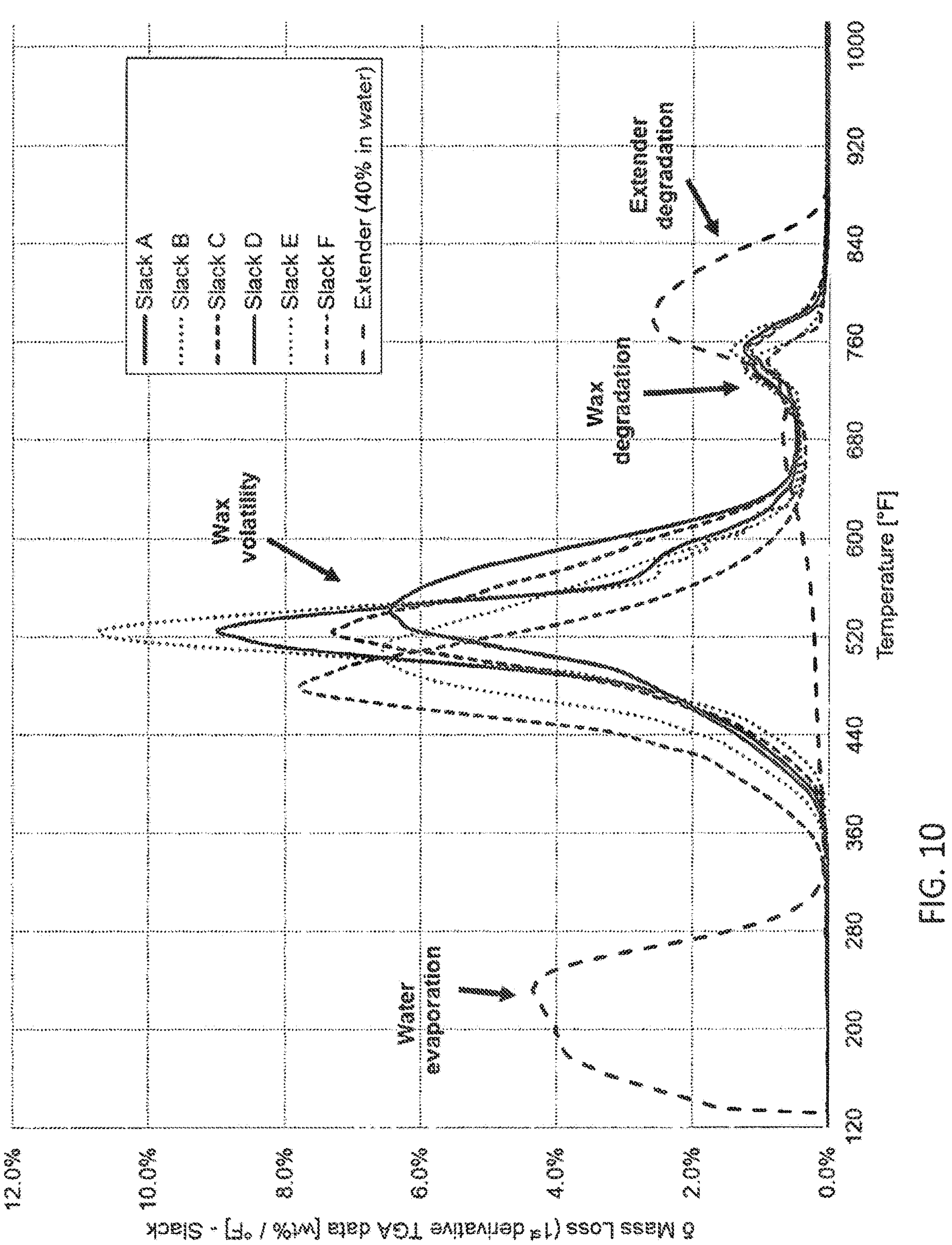
FIG. 10 is a chart showing the corresponding first derivative (δ) curves of the raw data shown in FIG. 9.

Slack wax samples (3 g±1 g material) were placed on a glass-fiber paper, on an aluminum pan in a Computrac Max 5000 XL, and ramped at 5° C./minute from 50° C. to 600° C. Raw data and the first derivative of weight loss with respect to temperature were plotted for each sample, and are shown in FIGS. 9 and 10, respectively. The raw TGA data in FIG. 9 shows that the different waxes begin to degrade above 280° F. The corresponding first derivative (δ) curves in FIG. 10 show a distinct, sharp peak, corresponding to the loss of mass in the raw data. This peak is hereinafter referred to as the "wax volatility peak". Comparisons were made between the slack wax TGA peak temperatures relative to the slack wax flash points measured with the COC method (ASTM D92).

FIGS. 9 and 10 also show TGA data for a 40% suspension of extender in water. This curve is included to demonstrate that the degradation temperature for the extender material is easily distinguishable from the wax volatility peak.

Figure 11:
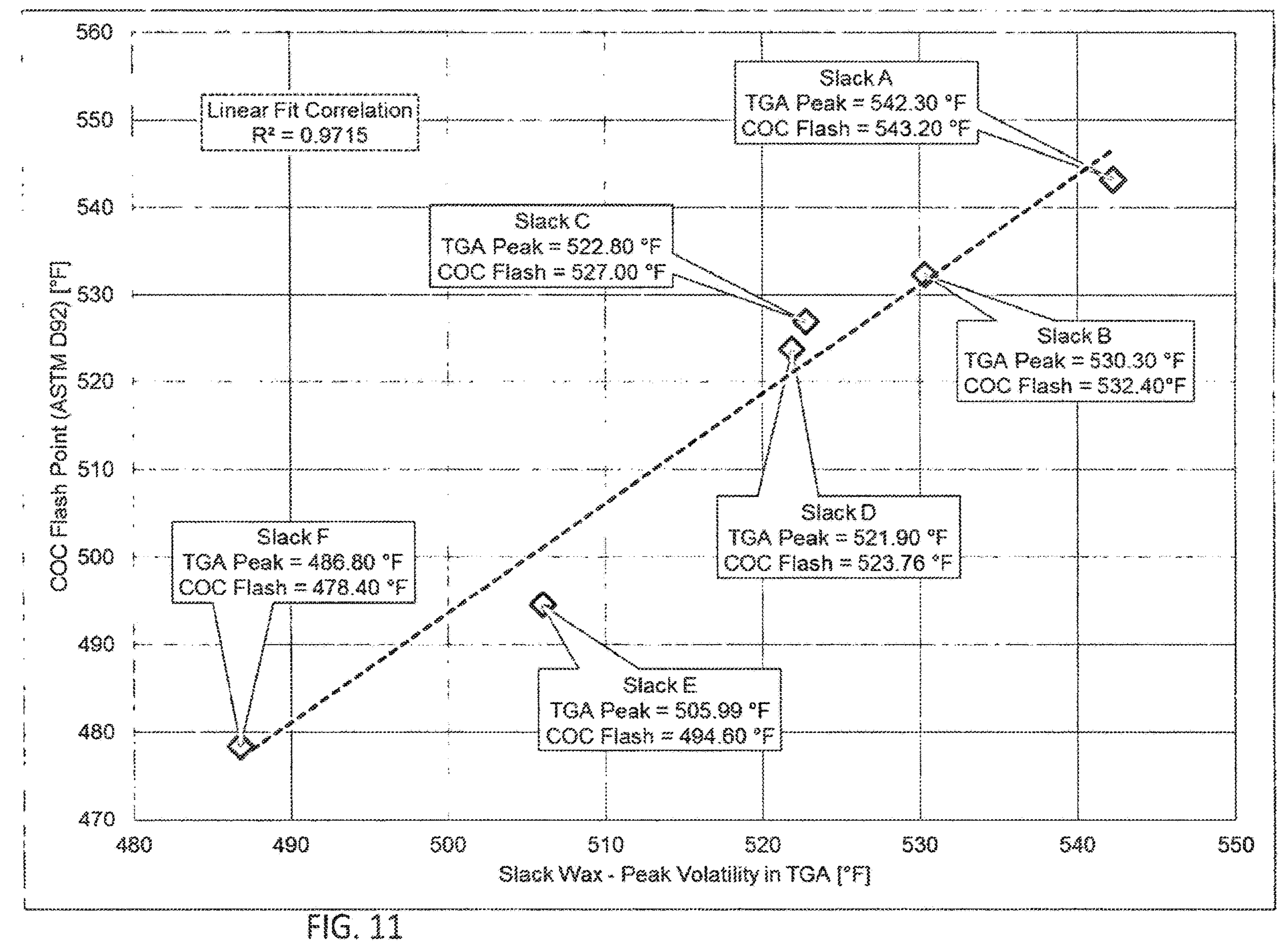
FIG. 11 is a chart correlating TGA wax volatility peaks for six different slack waxes with the COC flash point measured for the same slack wax.

The TGA wax volatility peaks for the exemplary emulsions are plotted relative to the COC flash point for the corresponding slack wax from the exemplary emulsions in FIG. 11. The correlation ($R^2$=0.9715) shows that TGA data can be used to effectively describe volatility of the wax material in the wax-extender emulsion, in compliment with the flash point data. Furthermore, the TGA data can be used to directly measure wax volatility in an emulsion.

Figure 12:
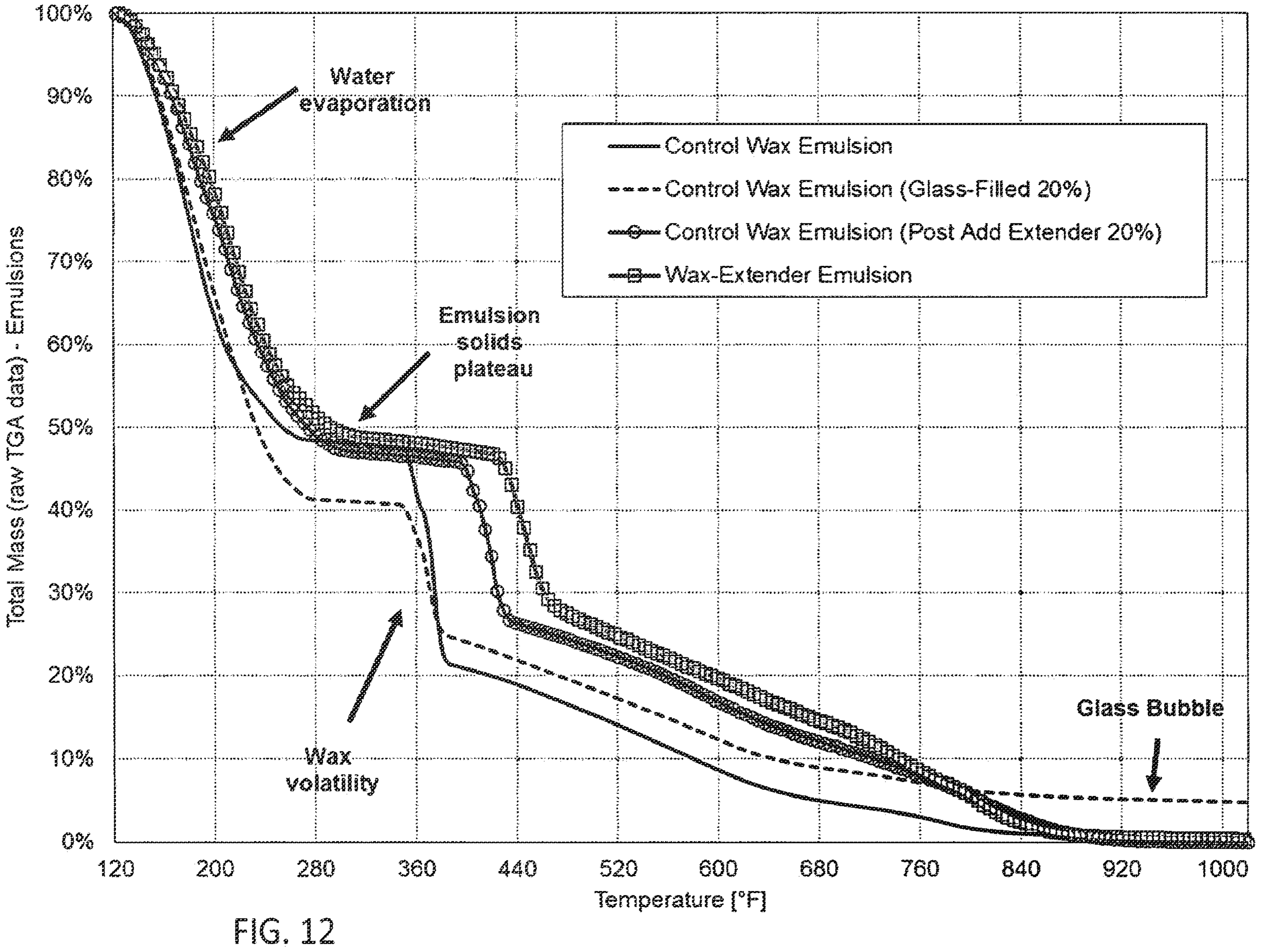
FIG. 12 is a chart showing TGA curves for a group of wax emulsions.
Figure 13:
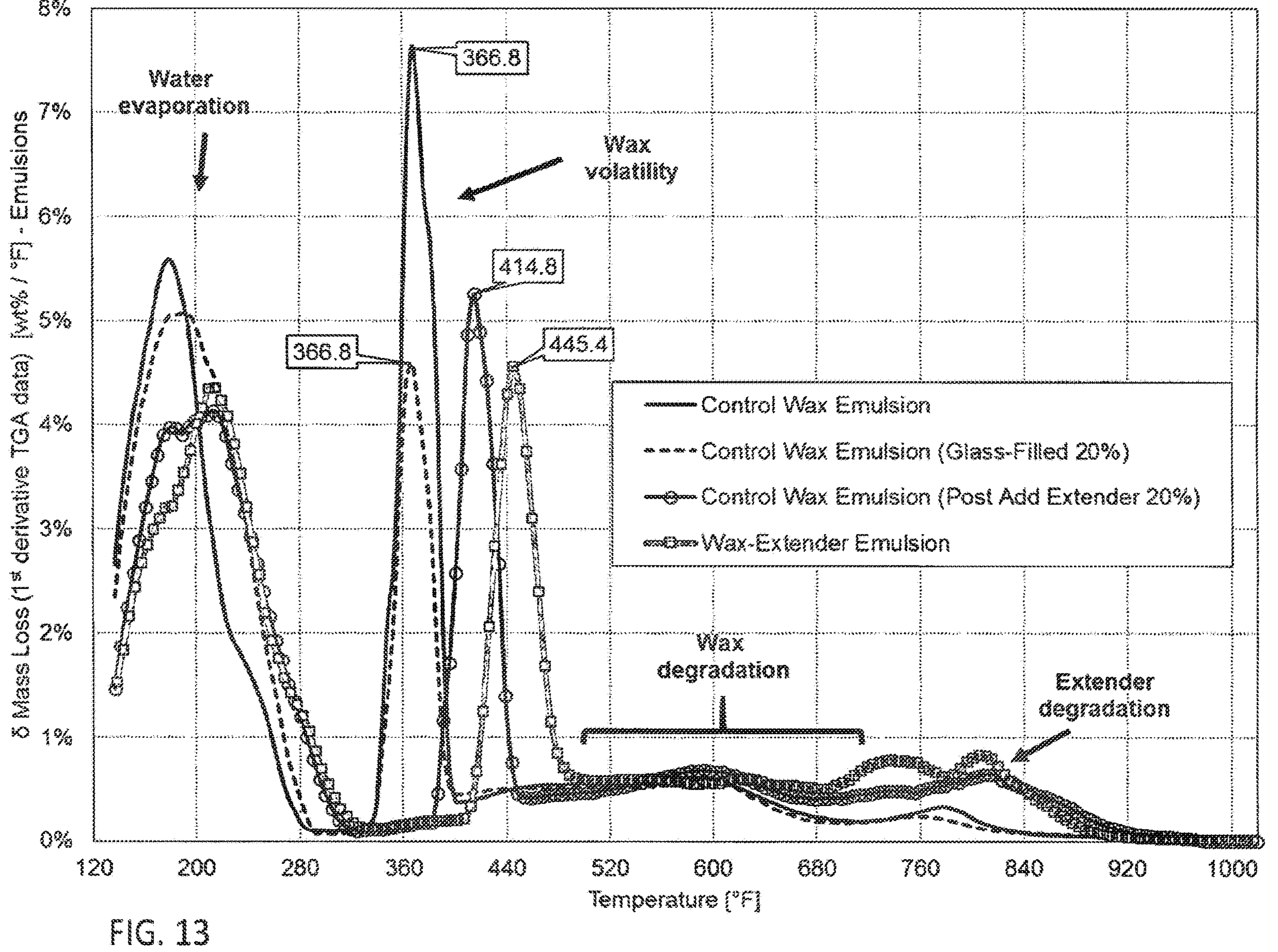
FIG. 13 is a chart showing the corresponding first derivative (δ) curves of the raw data shown in FIG. 12.

Additional testing was performed for four wax emulsion samples. One sample was a control wax emulsion with no extender. One sample was an exemplary embodiment of a wax-extender emulsion in accordance with an aspect of the present invention, wherein the extender replaced 20% of the wax solids. A third sample was a wax emulsion with extender added after emulsification and cooling, wherein the extender replaced 20% of the wax solids. The last sample was a wax emulsion wherein glass beads were used as filler. FIGS. 12 and 13 show wax emulsion TGA curves for the four wax emulsion samples. FIG. 12 illustrates raw data, and FIG. 13 illustrates the first derivative curve of mass loss with respect to temperature. The figures demonstrate that as the temperature increased, water evaporated first, followed by a plateau region corresponding with the emulsion solids. At still higher temperatures (above 280° F.), the wax component began to volatilize, and the wax volatility peak was again apparent (FIG. 13), just as was observed in the slack wax data (FIG. 10).

The control wax emulsion TGA data shows a wax volatility peak at 366.8° F. The exemplary embodiment of the wax-extender emulsion was prepared with the same base slack wax as the control emulsion. The exemplary wax-extender emulsion had a wax volatility peak of 445.4° F., demonstrating volatility suppression of greater than 78° F. (FIG. 13).

These results suggest that the extender material in the wax-extender emulsion is closely associated with the wax component, in a manner that is only achieved by co-homogenization at the time of emulsification. In fact, the results of testing showed that post addition of the same extender material does not provide the same magnitude of effect on the wax volatility peak. As shown in FIG. 13, the sample wherein the same extender material was added to the wax emulsion after emulsification and cooling, did increase the wax volatility peak, but only by 48° F. (FIG. 13). A reduced effect was expected because the wax material in the control emulsion was already solidified following emulsification and cooling by the time the extender was added. Thus, the post added extender could not closely associate with an already solidified wax moiety.

Without being bound by theory, it is believed that for the wax-extender emulsion described herein, the extender closely associates with and interacts with the wax component thereby stabilizing the low molecular weight wax material. As shown in FIGS. 12 and 13, adding glass bubbles, which are a non-reactive filler, after emulsification and cooling, had no effect on the wax volatility peak (FIG. 13).

The invention claimed is:

1. A process for producing an organic slurry, comprising:

introducing water to a vessel;

introducing a non-powdered lignin material to the vessel;

introducing a defoamer to the vessel; and combining and mixing the water, the non-powdered lignin material, and the defoamer in the vessel, wherein said slurry has a pH such that the non-powdered lignin material is insoluble in the water, and wherein the combining and mixing comprises imparting high shear and mixing on the water, the defoamer, and the non-powdered lignin material.

2. The process of claim 1, wherein a homogenizer, a high-speed mixer or a rotor-stator is used to impart the high shear and mixing on the water, the defoamer, and the non-powdered lignin material.

3. The process of claim 1, wherein the non-powdered lignin material comprises one or more byproducts of a pulping process, wherein the pulping process is selected from the group consisting of kraft pulping, sulfite pulping, acid hydrolysis, soda pulping, Organocell pulping, Acetosolv pulping, and combinations thereof.

4. The process of claim 1, wherein the non-powdered lignin material comprises one or more byproducts of kraft pulping.

5. The process of claim 1, further comprising introducing a pH modifier to the vessel.

6. The process of claim 5, wherein the pH modifier is sodium carbonate.

* * * * *